(12) United States Patent
Kettner et al.

(10) Patent No.: US 7,739,203 B2
(45) Date of Patent: Jun. 15, 2010

(54) METHOD AND SYSTEM FOR CLASSIFYING RETAIL PRODUCTS AND SERVICES USING PRICE BAND CATEGORIES

(75) Inventors: Björn Kettner, Saarbrücken (DE); Jörg Haupenthal, St. Wendel (DE)

(73) Assignee: SAP Aktiengesellschaft, Walldorf (DE)

( * ) Notice: Subject to any disclaimer, the term of this patent is extended or adjusted under 35 U.S.C. 154(b) by 1142 days.

(21) Appl. No.: 10/898,898

(22) Filed: Jul. 26, 2004

(65) Prior Publication Data

US 2005/0197971 A1 Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
G06Q 99/00 (2006.01)
(52) U.S. Cl. .................... 705/400; 705/1.1; 705/20; 705/26; 705/27; 705/28; 705/100; 705/102
(58) Field of Classification Search .......... 705/1, 705/400, 7, 14, 5, 26–28, 20, 1.1; 707/100, 707/102

See application file for complete search history.

(56) References Cited

U.S. PATENT DOCUMENTS

| 4,752,877 | A |  | 6/1988 | Roberts et al. |
| 5,315,508 | A |  | 5/1994 | Bain et al. |
| 5,400,253 | A |  | 3/1995 | O'Connor |
| 5,615,109 | A |  | 3/1997 | Eder |
| 5,675,637 | A |  | 10/1997 | Szlam et al. |
| 5,758,327 | A |  | 5/1998 | Gardner et al. |
| 5,774,866 | A |  | 6/1998 | Horwitz et al. |
| 5,870,716 | A |  | 2/1999 | Sugiyama et al. |
| 5,930,769 | A |  | 7/1999 | Rose |
| 5,930,771 | A |  | 7/1999 | Stapp |
| 5,974,418 | A | * | 10/1999 | Blinn et al. .................. 707/100 |
| 5,999,914 | A |  | 12/1999 | Blinn et al. |
| 6,029,139 | A |  | 2/2000 | Cunningham et al. |

(Continued)

FOREIGN PATENT DOCUMENTS

JP 2004-30343 A 1/2004

(Continued)

OTHER PUBLICATIONS

Kelkar et al., "Price Modeling in Standards for Electronic Product Catalogs Based on XML", May 7-11, 2002; WWW2002, Honolulu, Hawaii; 10 pages.*

(Continued)

Primary Examiner—John W Hayes
Assistant Examiner—Freda A Nelson
(74) Attorney, Agent, or Firm—Foley & Lardner LLP

(57) ABSTRACT

A method of and system for classifying retail products and services. The method of classifying retail products and services includes defining a price level group in a computerized system, wherein the price level group includes a price schema having a plurality of price levels, and wherein each price level is associated with a price band category. The method also includes assigning the price level group to a grouping of at least one of services and retail products.

42 Claims, 20 Drawing Sheets

U.S. PATENT DOCUMENTS

| | | | |
|---|---|---|---|
| 6,064,984 | A | 5/2000 | Ferguson et al. |
| 6,185,550 | B1 | 2/2001 | Snow et al. |
| 6,260,024 | B1 | 7/2001 | Shkedy |
| 6,341,351 | B1 | 1/2002 | Muralidhran et al. |
| 6,363,488 | B1* | 3/2002 | Ginter et al. ................ 726/1 |
| 6,366,890 | B1 | 4/2002 | Usrey |
| 6,484,149 | B1* | 11/2002 | Jammes et al. ............... 705/26 |
| 6,505,093 | B1 | 1/2003 | Thatcher et al. |
| 6,507,851 | B1 | 1/2003 | Fujiwara et al. |
| 6,567,822 | B1 | 5/2003 | Cudahy et al. |
| 6,614,895 | B1 | 9/2003 | Impey et al. |
| 6,678,695 | B1* | 1/2004 | Bonneau et al. ............ 707/102 |
| 6,701,299 | B2 | 3/2004 | Kraisser et al. |
| 6,725,204 | B1 | 4/2004 | Gusley |
| 6,829,348 | B1 | 12/2004 | Schroeder et al. |
| 6,868,528 | B2 | 3/2005 | Roberts |
| 6,910,017 | B1 | 6/2005 | Woo et al. |
| 6,980,966 | B1 | 12/2005 | Sobrado et al. |
| 7,080,030 | B2 | 7/2006 | Eglen et al. |
| 7,082,408 | B1 | 7/2006 | Baumann et al. |
| 7,082,426 | B2 | 7/2006 | Musgrove et al. |
| 7,092,929 | B1* | 8/2006 | Dvorak et al. ................ 705/28 |
| 7,117,165 | B1 | 10/2006 | Adams et al. |
| 7,124,098 | B2 | 10/2006 | Hopson et al. |
| 7,124,984 | B2 | 10/2006 | Yokouchi et al. |
| 7,139,731 | B1 | 11/2006 | Alvin |
| 7,177,825 | B1 | 2/2007 | Borders et al. |
| 7,188,080 | B1 | 3/2007 | Walker et al. |
| 7,308,421 | B2* | 12/2007 | Raghupathy et al. ......... 705/20 |
| 7,346,561 | B1 | 3/2008 | Devitt et al. |
| 7,424,440 | B1 | 9/2008 | Gupta et al. |
| 2001/0019778 | A1 | 9/2001 | Gardaz et al. |
| 2001/0032130 | A1 | 10/2001 | Gabos et al. |
| 2001/0039517 | A1 | 11/2001 | Kawakatsu |
| 2001/0049634 | A1 | 12/2001 | Stewart |
| 2002/0013731 | A1 | 1/2002 | Bright et al. |
| 2002/0023500 | A1 | 2/2002 | Chikuan et al. |
| 2002/0026368 | A1* | 2/2002 | Carter, III .................... 705/20 |
| 2002/0042731 | A1 | 4/2002 | King, Jr. et al. |
| 2002/0059093 | A1 | 5/2002 | Barton et al. |
| 2002/0059108 | A1 | 5/2002 | Okura et al. |
| 2002/0072986 | A1 | 6/2002 | Aram |
| 2002/0073114 | A1 | 6/2002 | Nicastro et al. |
| 2002/0078159 | A1 | 6/2002 | Petrogiannis et al. |
| 2002/0107713 | A1 | 8/2002 | Hawkins |
| 2002/0116241 | A1 | 8/2002 | Sandhu et al. |
| 2002/0123930 | A1 | 9/2002 | Boyd et al. |
| 2002/0138290 | A1 | 9/2002 | Metcalfe et al. |
| 2002/0147668 | A1 | 10/2002 | Smith et al. |
| 2002/0152128 | A1 | 10/2002 | Walch et al. |
| 2002/0156686 | A1 | 10/2002 | Kraft et al. |
| 2002/0184116 | A1* | 12/2002 | Tam et al. .................... 705/27 |
| 2003/0023500 | A1 | 1/2003 | Boies et al. |
| 2003/0028393 | A1 | 2/2003 | Coulston et al. |
| 2003/0028437 | A1 | 2/2003 | Grant et al. |
| 2003/0046120 | A1 | 3/2003 | Hoffman et al. |
| 2003/0046195 | A1 | 3/2003 | Mao |
| 2003/0050852 | A1 | 3/2003 | Liao et al. |
| 2003/0055718 | A1 | 3/2003 | Cimini et al. |
| 2003/0074269 | A1 | 4/2003 | Viswanath |
| 2003/0083961 | A1 | 5/2003 | Bezos et al. |
| 2003/0126024 | A1 | 7/2003 | Crampton et al. |
| 2003/0144916 | A1 | 7/2003 | Mumm et al. |
| 2003/0149631 | A1 | 8/2003 | Crampton et al. |
| 2003/0149674 | A1 | 8/2003 | Good et al. |
| 2003/0158791 | A1 | 8/2003 | Gilberto et al. |
| 2003/0171998 | A1 | 9/2003 | Pujar et al. |
| 2003/0172007 | A1 | 9/2003 | Helmolt et al. |
| 2003/0200150 | A1 | 10/2003 | Westcott et al. |
| 2003/0200156 | A1* | 10/2003 | Roseman et al. .............. 705/27 |
| 2003/0208365 | A1 | 11/2003 | Avery et al. |
| 2003/0225778 | A1* | 12/2003 | Fisher et al. ................ 707/102 |
| 2003/0229502 | A1 | 12/2003 | Woo |
| 2004/0010463 | A1 | 1/2004 | Hahn-Carlson et al. |
| 2004/0042611 | A1 | 3/2004 | Power et al. |
| 2004/0098358 | A1 | 5/2004 | Roediger |
| 2004/0122689 | A1 | 6/2004 | Dailey et al. |
| 2004/0162763 | A1 | 8/2004 | Hoskin et al. |
| 2004/0172321 | A1 | 9/2004 | Vemula et al. |
| 2004/0186765 | A1 | 9/2004 | Kataoka |
| 2004/0186783 | A1 | 9/2004 | Knight et al. |
| 2004/0210489 | A1 | 10/2004 | Jackson et al. |
| 2004/0220861 | A1 | 11/2004 | Morciniec et al. |
| 2004/0243428 | A1 | 12/2004 | Black et al. |
| 2004/0267674 | A1* | 12/2004 | Feng et al. .................. 705/400 |
| 2005/0015303 | A1 | 1/2005 | Dubin et al. |
| 2005/0021551 | A1 | 1/2005 | Silva et al. |
| 2005/0055283 | A1 | 3/2005 | Zarovinsky |
| 2005/0060270 | A1 | 3/2005 | Ramakrishnan |
| 2005/0065872 | A1 | 3/2005 | Moebs et al. |
| 2005/0075915 | A1 | 4/2005 | Clarkson |
| 2005/0075941 | A1 | 4/2005 | Jetter et al. |
| 2005/0086122 | A1 | 4/2005 | Cirulli et al. |
| 2005/0096963 | A1 | 5/2005 | Myr et al. |
| 2005/0102175 | A1 | 5/2005 | Dudat et al. |
| 2005/0102192 | A1 | 5/2005 | Gerrits et al. |
| 2005/0102227 | A1 | 5/2005 | Solonchev |
| 2005/0137932 | A1 | 6/2005 | D'Angelo |
| 2005/0165659 | A1 | 7/2005 | Gruber |
| 2005/0171825 | A1 | 8/2005 | Denton et al. |
| 2005/0197952 | A1 | 9/2005 | Shea et al. |
| 2005/0216359 | A1 | 9/2005 | Welter et al. |
| 2005/0228685 | A1 | 10/2005 | Schuster et al. |
| 2005/0256727 | A1 | 11/2005 | Bennett et al. |
| 2005/0261954 | A1 | 11/2005 | Aoyama et al. |
| 2006/0020512 | A1 | 1/2006 | Lucas et al. |
| 2006/0036507 | A1 | 2/2006 | Pujar et al. |
| 2006/0112099 | A1* | 5/2006 | Musgrove et al. .............. 707/7 |
| 2006/0282360 | A1 | 12/2006 | Khan et al. |
| 2007/0050272 | A1 | 3/2007 | Godlewski et al. |
| 2008/0167936 | A1 | 7/2008 | Kapoor |

FOREIGN PATENT DOCUMENTS

| | | |
|---|---|---|
| WO | WO 99/45450 A2 | 9/1999 |
| WO | WO 01/71635 A2 | 9/2001 |
| WO | WO 0171635 A2 * | 9/2001 |

OTHER PUBLICATIONS

Georgantis et al., "A Review and Evaluation of platforms and Tools for Building e-Catalogs", 2002, Proceedings of the 35th Hawaii International Conference on System Sciences, 2002 IEEE, 10 pages.*

Fennell et al., "A Integrated Approach-Market Definition, Market Segmentation, and Brand Positioning Create a Powerful Combination", Winter 2004, Market Research, pp. 29-34, 7 pgs.*

Poisson, John, "Value Creation Through Tactical Pricing", 2004, PIMA Conference, New Orleans, LA; 11 pages.*

PIMA 2004 Leadership Conference Schedule of Events for Monday, Jun. 28, 2004, Winter/Spring 2004, The PIMA Post, 8 pages.*

U.S. Appl. No. 60/374,892, filed Apr. 22, 2002, Krajec.

"Beyond Markdown Management", summer/autumn 03, the 4caster, Issue 4, vol. 2, 4 pages.

"Retailers Manage Markdown Challenges Using i2 Solutions", Jan. 13, 2003, NFR 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Subrahmanyan et al., "Developing optimal pricing and inventory policies for retailers who face uncertain demand", Journal of Retailing, vol. 72, No. 1, Spring, 1996, 15 pages.

Bender, Walter, "When Product Designers Use Perceptually Based Color Tools", Journal of Electronic Imaging, Jan. 2001, vol. 10(1), pp. 188-193.

Kelkar et al., Price Modeling in Standards for Electronic Product Catalogs Based on XML, 2002, pp. 366-375.

Kumar et al., "Managing Supplier Relationships", Quality Progress, vol. 36, Iss. 9, Sep. 2003, pp. 24-30.

Office Action for U.S. Appl. No. 10/913,645, mail date Nov. 2, 2009, 17 pages.

Office Action for U.S. Appl. No. 10/913,645, mail date May 28, 2009, 15 pages.

Office Action for U.S. Appl. No. 10/913,645, mail date Oct. 30, 2008, 11 pages.

Office Action for U.S. Appl. No. 10/935,470, mail date Aug. 26, 2008, 11 pages.

Office Action for U.S. Appl. No. 10/935,470, mail date Feb. 6, 2009, 13 pages.

Office Action for U.S. Appl. No. 10/935,470, mail date Jul. 16, 2009, 11 pages.

Office Action for U.S. Appl. No. 11/048,124, mail date Apr. 29, 2009, 17 pages.

Office Action for U.S. Appl. No. 11/048,124, mail date Dec. 31, 2009, 17 pages.

Office Action for U.S. Appl. No. 11/074,369, mail date Aug. 1, 2008, 9 pages.

Office Action for U.S. Appl. No. 11/074,369, mail date Dec. 11, 2007, 7 pages.

Office Action for U.S. Appl. No. 11/220,449, mail date Sep. 21, 2009, 14 pages.

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", Financial World, vol. 162, No. 22, Nov. 9, 1993 (p. 50(2)).

Brown, "The Effects of Assortment Composition Flexibility on Operating Efficiency", (Abstract Only), Dissertation Abstracts Int'l., vol. 55/08-A, available at least by 1994, (p. 2458).

Jensen et al., "Long-Term Construction Contracts: The Impact of Tamra '88 on Revenue Recognition", Journal of Construction Education, Spring 1997, vol. 2, No. 1, pp. 37-53.

Srinivasan et al., Concepts and strategy guidelines for designing value enhancing sales promotions, Journal of Product and Brand Management, vol. 7, No. 5, 1998, pp. 410-420.

Wilson, "Changing the Process of Production", Industrial Management, vol. 37, No. 1, Jan./Feb. 1995 (pp. 1-2).

\* cited by examiner

Preisstufen: 04.12.2003 - 20.12.2003

| Preisstufe | Kz | Preisschwelle | Preislagentyp |
|---|---|---|---|
| 001 | ≤ | 19,99 | U |
| 002 | ≤ | 24,99 | M |
| 003 | ≤ | 29,99 | M |
| 004 | ≤ | 34,99 | M |
| 005 | ≤ | 39,99 | O |
| 006 | ≤ | 0,00 | |
| 007 | ≤ | 0,00 | |
| 008 | ≤ | 0,00 | |
| 009 | ≤ | 0,00 | |
| 999 | > | 39,99 | O |

FIG. 12

METHOD AND SYSTEM FOR CLASSIFYING RETAIL PRODUCTS AND SERVICES USING PRICE BAND CATEGORIES

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of analyzing and reporting sales data, and more specifically to methods of and systems for analyzing and reporting sales data by classifying retail products and services using price band categories.

Price is a classification which is often used by merchants in order to analyze and report sales data for retail products and services. Price is not a useful classification, however, where the actual price of the products or services is subject to frequent change. While ad-hoc price-based groupings may be created to account for changes in price, the creation of such groupings is inefficient and time consuming. Thus, there is need for a method for and system of classifying retail products and services using price band categories which provides for convenient and efficient reporting and analysis of sales data for retail products and services.

SUMMARY

According to an exemplary embodiment, a method of classifying retail products and services includes defining a price level group in a computerized system, wherein the price level group includes a price schema having a plurality of price levels, and wherein each price level is associated with a price band category. The method also includes assigning the price level group to a grouping of at least one of services and retail products.

According to another exemplary embodiment, a system for classifying retail product and services includes means for defining a price level group, wherein the price level group includes a price schema having a plurality of price levels, and wherein each price level is associated with a price band category. The system also includes means for assigning the price level group to a grouping of at least one of services and retail products.

According to another exemplary embodiment, a program product for classifying retail product and services includes machine-readable program code for causing, when executed, one or more machines to perform the step of defining a price level group, wherein the price level group includes a price schema having a plurality of price levels, and wherein each price level is associated with a price band category; and the step of assigning the price level group to a grouping of at least one of services and retail products.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 12 illustrates in greater detail an area of the screen of FIG. 11 which may be used to create price levels for a price schema according to an exemplary embodiment;

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Furthermore while the embodiments described herein refer primarily to retail products or retail sales articles, it is envisioned that the present description will be applicable to the sale of any type of good or service.

Figure 1:
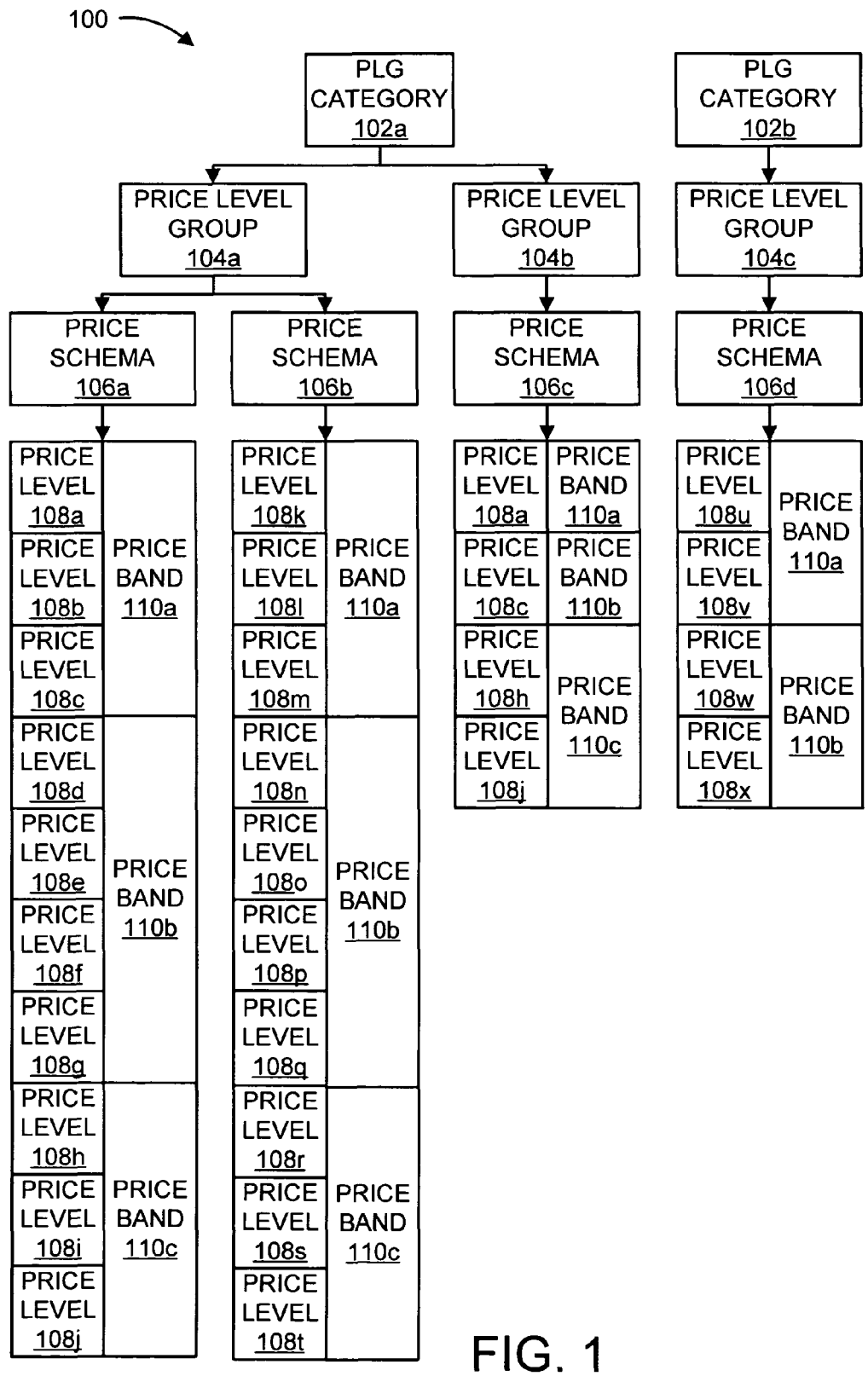
FIG. 1 is a block diagram which illustrates a pricing structure for implementing price level groups according to an exemplary embodiment.

FIG. 1 illustrates a pricing structure 100 for implementing price level groups according to an exemplary embodiment. Structure 100 includes one or more price level group categories 102, one or more price level groups 104, one or more price schemas 106, one or more price levels 108, and one or more price band categories 110. For example, in the illustrated embodiment, data structure 100 includes price level group categories 102a and 102b, price level groups 104a-104c, price schemas 106a-106d, price levels 108a-108x, and price band categories 110a-110c. Structure 100 may generally be used to facilitate the analysis and reporting of sales data for retail products and services according to price levels and/or price band categories.

Each price level group category 102 includes one or more price level groups 104. For example, in the illustrated embodiment, price level group category 102a includes price level groups 104a and 104b, and price level group category 102b includes price level group 104c. Each price level group category 102 defines the basic attributes of each of the price level groups 104 included within, such that the same basic attributes are applied to each price level group 104. Accordingly, price level group categories 102 may be used to control how each associated price level group 104 may be assigned to a particular grouping of retail products or services, such as a node in a merchandise hierarchy or a node in an article hierarchy as will be described below with reference to FIGS. 2-7.

Each price level group category 102 may also be used to filter or sort among several price level groups 104. For example, in the illustrated embodiment, price level groups 104a-104c may be filtered according to price level group categories 102a and 102b such that filtering according to price level group category 102a would result in price level groups 104a and 104b being selected.

Each price level group 104 may be assigned to one or more groupings of retail products or services, and includes one or more price schemas 106. Accordingly, each price level group 104 may be used to associate one or more corresponding price schemas 106 to the grouping or groupings of retail products or services to which the price level group 104 is assigned. For example, in the illustrated embodiment, price level group 104a may be used to associate corresponding price schemas 106a and 106b with a grouping of retail products or services to which price level group 104a is assigned. Similarly, price level group 104b may be used to associate price schema 106c with a grouping of retail products or services to which price level group 104b is assigned, and price level group 104c may be used to associate price schema 106d with a grouping of retail products or services to which price level group 104c is assigned.

Each price schema 106 includes one or more price levels 108. For example, in the illustrated embodiment, price schema 106a includes price levels 108a-108j, price schema 106b includes price levels 108k-108t, price schema 106c includes price levels 108a, 108c, 108h, and 108j, and price schema 106d includes price levels 108u-108x. Each price schema 106 may be defined by a temporal validity period. For example, price schema 106c may have an assigned validity period of Jan. 1, 2004 to Jun. 31, 2004. When multiple price schemas 106 are included in a single price level group 104, the validity periods for each price schema may be temporally separated such that no gaps or overlaps exist. For example, in the illustrated embodiment, price schema 106a may have an assigned validity period of Jan. 1, 2004 to Jun. 31, 2004, and price schema 106b may have a validity period of Jul. 1, 2004 to Dec. 31, 2004.

Each price level 108 contains a price limit or threshold. For example, price level 108a may contain the price limit or threshold "5 dollars," price level 108b may contain the price limit or threshold "<10 dollars," and price level 108c may contain the price limit or threshold "<15 dollars." Each price level 108 may also be assigned to a price band category 110. For example, in the illustrated embodiment, price levels 108a, 108b, and 108c are assigned to price band category 110a, price levels 108d, 108e, 108f, and 108g are assigned to price band category 110b, and price levels 108h, 108i, and 108j are assigned to price band category 110c.

The temporal validity of each price level 108 is determined by the assigned validity period of the corresponding price schema 106. For example, if price schema 106a has an assigned validity period of Jan. 1, 2004 to Jun. 31, 2004, and price schema 106b has a validity period of Jul. 1, 2004 to Dec. 31, 2004, then price levels 108a-108j will be valid from Jan. 1, 2004 to Jun. 31, 2004, and then price levels 108k-108t will be valid from Jul. 1, 2004 to Dec. 31, 2004. Any number or combination of price levels may be assigned to a price schema 106 for the assigned validity period. According to an exemplary embodiment, ten price levels 108 are maintained for each price schema 106 by default. According to another exemplary embodiment, the number of price levels 108 is different for differing validity periods according to added or deleted price levels 108. Price schemas 106 may also have differing price levels 108 during their respective validity periods. For example, in the illustrated embodiment, price schema 106a includes ten price levels 108a-108j, while price schema 106b includes 10 different price levels 108k-108t.

Each price band category 110 is associated with a particular price range. For example, according to an exemplary embodiment, each price band category 110 may be associated with a particular price range indicative of a consumer's subjective price perception as it relates to the sales price of a retail product or service. In this embodiment, any number of price bands may be defined to reflect varying levels or categories of a consumer's subjective price perception as it relates to the sales price of particular retail products or services. For example, in the illustrated embodiment, the three defined price band categories, 110a, 110b, and 110c, may represent a consumer price perception model having the levels "Lower," "Medium," and "Upper," where price band category 110a represents the "Lower" level, price band category 110b represents the "Medium" level, and price band category 110c represents the "Upper" level. Price levels 108 may then be assigned to a particular price band category 110 according to the particular price range represented by the price band category 110. For example, in the illustrated embodiment, price levels 108a-108c may be assigned to the "Lower" level, price levels 108d-108g may be assigned to the "Medium" level, and price levels 108h-108j may be assigned to the "Upper" level based on the price limits they represent.

As described above, each price level group 104 may be assigned to a grouping of retail products or services. The grouping of retail products or services may be, for example, a node within a merchandise hierarchy or a node within an article hierarchy. Assigning a price level group 104 to a grouping of retail products or services in turn assigns a price schema 106 to that grouping of retail products or services. Because each price schema 106 includes a number of individual price levels 108 and a number of associated price band categories 110, each price schema 106 may be used to report and analyze sales data for retail products or services to which the associated price level group 104 is assigned during the validity period of the price schema 106 according to each included price level 108 or each associated price band category 110. For example, in the illustrated embodiment, if price band category 110a represents the "Lower" level, price band category 110b represents the "Medium" level, and price band category 110c represents the "Upper" level, sales data for retail products or services associated with price level group 104a may be analyzed as to how sales are distributed among the "Lower" price band category 110a, "Medium" price band category 110b, and "Upper" price band category 110c. Similarly, sales data for retail products or services associated with price level group 104a may also be analyzed as to how sales are distributed among price levels 108a-108j during the validity period of price schema 106a, and among price levels 108k-108t during the validity period of price schema 106b.

Figure 2:
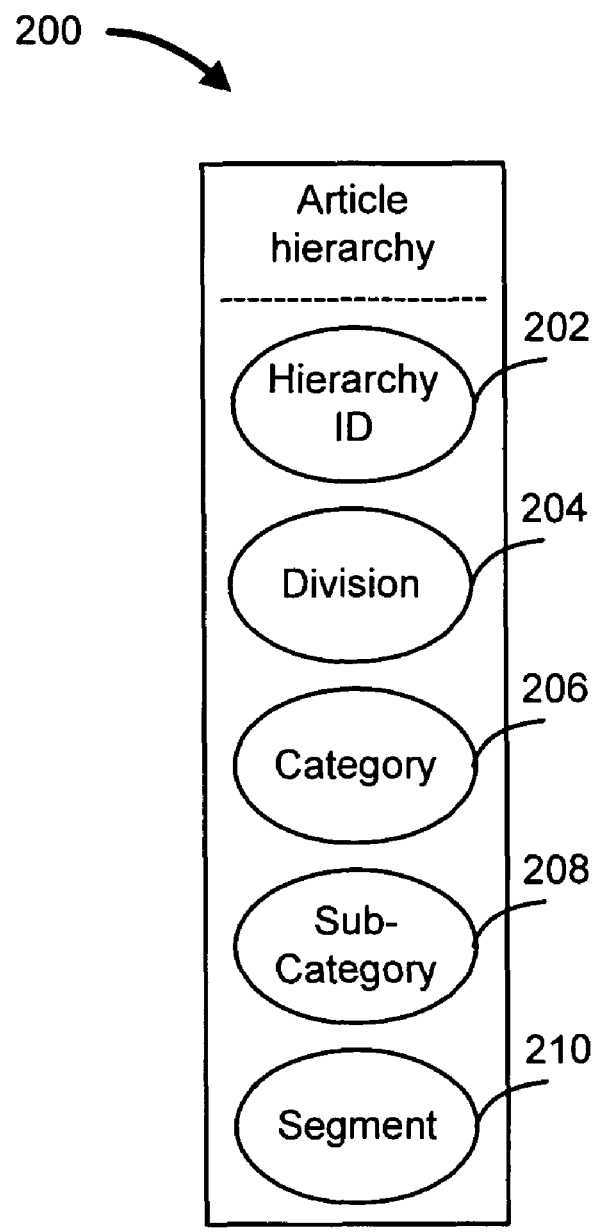
FIG. 2 is a block diagram which illustrates an article hierarchy to which a price level group may be assigned according to according to an exemplary embodiment.

FIG. 2 illustrates a product hierarchy structure in the form of an article hierarchy 200 to which a price level group may be assigned according to according to an exemplary embodiment. A product hierarchy structure is a data structure comprising multiple levels of abstraction which may be used to group an aggregation of retail products or services hierarchically in a sales oriented structure. Product hierarchy structures are typically determined as part of a general process of assortment definition and planning, which generally involves creating associations between retail products or services and stores based on numerous criteria, and which is described in further detail in co-pending U.S. application Ser. No. 10/886, 260, filed Jul. 8, 2004, and entitled "System And Method For Performing Assortment Definition," the entire contents of which are incorporated herein by reference.

In FIG. 2, article hierarchy 200 is illustrated with a hierarchy ID level (e.g., a number) 202, a division level 204, a category level 206, a subcategory level 208, and a segment level 210. Article hierarchy 200 may be customized by a user to include additional levels (e.g., a subsegment level below segment level 210) or fewer levels, as well as different names, to better represent the merchandise (e.g., products or articles) layout associated with a particular enterprise. According to an exemplary embodiment, article hierarchies may be defined with up to 10 levels.

Although the names and number of levels in article hierarchy 200 can be customized, one level in article hierarchy 200 must be defined as the "category" level. The category level may be selected to represent the independent presentation spaces in a store that are devoted to merchandise categories presented to consumers in a unified manner. In the department store context, for example, the category level in article hierarchy 200 may be selected to represent differentiated groupings of shops in the department stores such as confectionaries, menswear departments, and ladies wear departments. Alternatively, a lower level in article hierarchy 200 may be selected to represent the different independent presentation spaces for subgroups of merchandise (e.g., long-arm blouses, short-arm blouses, trousers) within each shop in a department store. Other criteria for selecting the category level may also be used.

In an exemplary embodiment, the level in article hierarchy 200 selected to be the category level has several additional properties that are unique to that level. One unique property of the category level is that stores can be assigned only to that level. These assignments make sense primarily in the context of department stores, wherein the stores that are assigned to a category are the shops in different department stores which (primarily) present goods from this category. For example, in most department stores there is a section for "men's fashion." Hence, a category may be defined in the system for "men's fashion," and this section in the department store may be treated as a shop in the system.

Another unique property of the category level in article hierarchy 200 is that the assignment of articles (as described in detail below) to article hierarchy 200 must be unique below the category level. That is, each article can be assigned only once to a node at or below a particular category node. By contrast, the same article can be assigned again to a different node at or above the category level (e.g., the division level).

Figure 3:
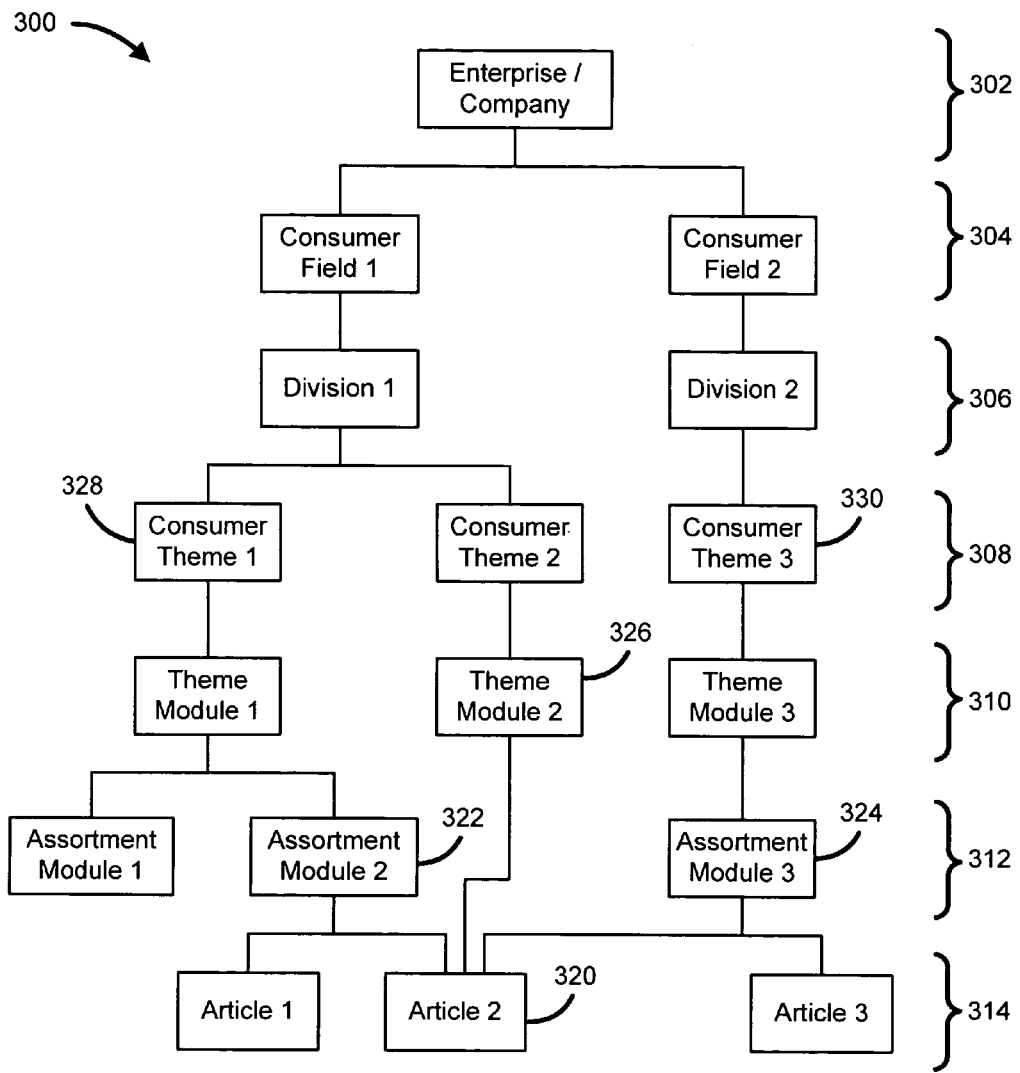
FIG. 3 is a block diagram which illustrates in greater detail the article hierarchy of FIG. 2 according to an exemplary embodiment.

To further illustrate, FIG. 3 illustrates an article hierarchy 300, which shows in greater detail an exemplary embodiment of the article hierarchy of FIG. 2. In the illustrated embodiment, article hierarchy 300 has been defined to include seven distinct levels, comprising: an enterprise level 302, a consumer field (CF) level 304, a division level 306, a consumer theme (CT) level 308, a theme module (TM) level 310, an assortment module (AM) level 312, and an article level 314. CF level 304 may be selected to represent different high level groupings of retail products or services (e.g., fashion, sport). CT level 308 may be selected to represent retail product or service categories presented to consumers in a unified manner, such as the individual shops in a department store. TM level 310 may be selected to represent the different independent presentation spaces for subgroups of merchandise (e.g., long-arm blouses, short-arm blouses, trousers) within each shop in a department store. AM level 312 may be selected to group articles according to various criteria such as the time periods during which such articles will be displayed, the stores to which they will be assigned, etc.

According to an exemplary embodiment, the relationships between the various nodes in article hierarchy 300 may be as follows. The relationship between the nodes of each level above AM level 312 and the node(s) in the next lower level is 1:n. For example, each node in TM level 310 may be assigned or linked to one or more child nodes in AM level 312, while each node in AM level 312 is linked to exactly one parent node in TM level 310. In contrast to the nodes above AM level 312, the relationships between the nodes in AM level 312 and the nodes in Article level 314 may be n:m. That is, a single node in AM level 312 may be linked to one or more child nodes in article level 314, while each node in article level 314 may be linked to one or more parent nodes in AM level 312 so long as each parent node in AM level 312 is in a different category. Thus, in the embodiment illustrated in FIG. 3, article node 320 may be linked to both AM node 322 and AM node 324 in AM level 312 because nodes 322 and 324 are assigned to different categories. In particular, AM node 322 is assigned to the category represented by CT node 228 and AM node 324 is assigned to the category represented by CT node 330. In some embodiments, individual articles in article level 314 may be assigned directly to nodes above AM level 312. For example, article node 320 may be linked directly to TM node 326. This assignment is permissible because TM node 226 is assigned is assigned to a different category than either CT node 328 or 330. In an exemplary embodiment, the user can set a flag to indicate whether the assignment of individual article nodes to more than one parent node in AM level 312 and/or to other higher level nodes is allowable or prohibited.

Figure 4:
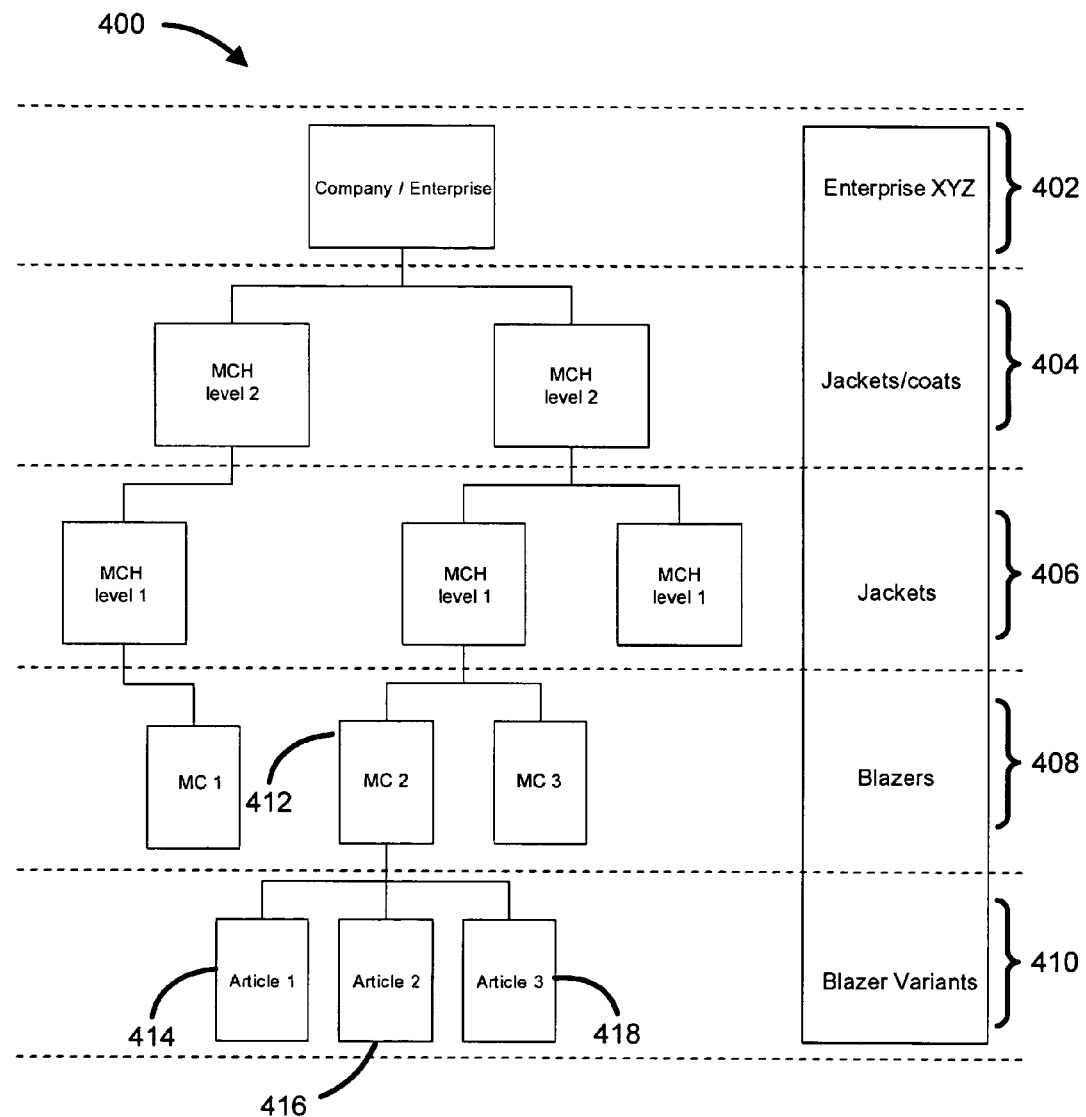
FIG. 4 is a block diagram illustrating a merchandise hierarchy according to an exemplary embodiment.

Article hierarchies, such as article hierarchy 300 represent only one of may possible ways to hierarchically organize and view retail products and services. For example, FIG. 4 illustrates a merchandise hierarchy 400 according to an exemplary embodiment. Merchandise hierarchy 400 represents a long-term retail product or service grouping in a classification structure that is independent of a store structure or layout. Instead, retail products or services are grouped in merchandise hierarchy 400 based on common inherent characteristics (e.g., all beverages may be grouped together regardless of their type and how or where they are displayed in the stores).

In the illustrated embodiment, a merchandise (MC) level 408 represents the lowest level in merchandise hierarchy 400. This means that different articles that are assigned to the same MC node usually have at least the same characteristic(s) represented by the MC node. For example, articles 414, 416 and 418 (comprising three blazers having different styles, sizes and/or colors) in an article level 410 are assigned to a single MC node 412 and thus have at least the same characteristic(s) (e.g., they are all blazers) represented by MC node 412. According to an exemplary embodiment, each article is assigned to exactly one MC node in merchandise hierarchy 400, and multiple MC nodes can be grouped together to form merchandise hierarchy (MCH) levels. For example, merchandise hierarchy 400 is illustrated with a MCH level 406 (comprising a "jackets" category) immediately above MC level 408, and a higher MCH level 404 (comprising a "jackets/coats" category) above MCH level 406. Similar to article hierarchy 300 (shown in FIG. 3), the topmost layer in merchandise hierarchy 400 is an enterprise level 402. The nodes in the lowermost level in merchandise hierarchy 400 and in similar merchandise hierarchies may be referred to as merchandise categories. Thus, categories may represent differentiated, independently controllable groups of retail products and/or services that consumers recognize as different and/or exchangeable to satisfy a need.

A merchandise hierarchy may be formed for various reasons. For example, it may be formed to: (i) plan an assortment (as described in detail below), (ii) enable structured analyses in the information system and the planning of target and actual values at the MC level, and (iii) save common data (such as conditions) at superior levels to reduce storage space. According to an exemplary embodiment, the following information may be defined for each MC node: price, color, and size groups; validity periods; n characteristics; and status values. In this embodiment, colors may be saved hierarchically as main colors or single colors. The main colors can have various characteristic values, which represent the single colors. In this case, the single colors are variant-creating characteristics. Accordingly, a merchandise hierarchy having this structure would allow for analysis of main colors, single colors, and attribute values.

The characteristics of articles in a merchandise hierarchy may be used for classification. Characteristics represent defined properties of an object, such as the color of a blouse. Characteristics help to differentiate objects from one another and find specific articles in the information system (e.g., list all articles with characteristic value "Red" of the "Color" characteristic). Characteristics can be either variant-creating (i.e., used in the definitions of the article variants) or purely informative. According to an exemplary embodiment, two or three-dimensional variant-creating characteristics can be defined for each MC node.

According to another embodiment, below the MC level, and thus below the entire merchandise hierarchy, characteristic profiles may be defined to segment or specialize the merchandise hierarchy. This may be done to simplify the creation of new generic articles, variants, and single articles.

In this embodiment, a characteristic profile may be used to define the set of values for a characteristic that are permitted in that particular profile. For example, a characteristic profile called "Ladies' sizes, Germany" could define the sizes 34 to 48. Multiple characteristic profiles can be created for multiple nodes in merchandise hierarchy 400. A characteristic profile can be assigned several times within the merchandise hierarchy. Thus, every article that is assigned to a node in merchandise hierarchy 400 can optionally be assigned to a characteristic profile. According to an exemplary embodiment, the relationship between characteristic profiles and nodes in merchandise hierarchy 400 is n:m. That is, a single characteristic profile can be linked to multiple nodes in merchandise hierarchy 400, and vice versa.

As persons skilled in the art will appreciate, the use of characteristic profiles provides several advantages. For example, characteristic profiles can be used to (i) group sets of colors and sizes, (ii) assign them to the relevant nodes in merchandise hierarchy 400, and (iii) select the suitable profile when creating articles.

Referring again to FIG. 1, each price level group 104 may be assigned to a grouping of retail products or services in a number of ways according to settings defined within the price level group category 102 associated with the price level group 104. For example, according to an exemplary embodiment, each price level group category 102 may be configured to control whether multiple price level groups 104 may be assigned to a particular grouping of retail products or services, whether each price level group 104 within the category may be assigned to multiple groupings of retail products or services, and whether assignment of each price level group 104 within the category to a grouping of retail products or services is required. According to another exemplary embodiment, a single standard price level group category 102 is created to control the attributes of all price level groups 104 assigned to merchandise hierarchies, while multiple price level group categories 102 may be created for use with article hierarchy nodes or other groupings of retail products or services.

Figure 5:
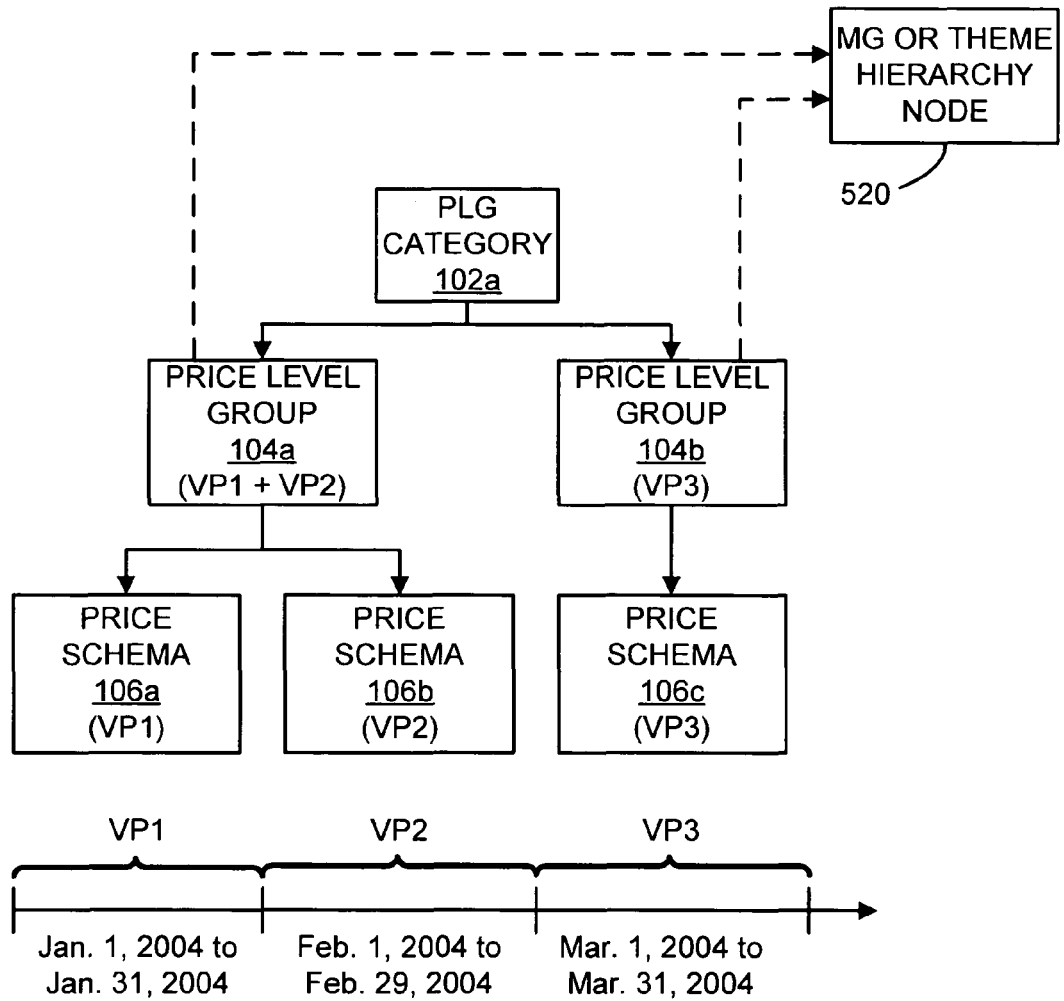
FIG. 5 is a block diagram which illustrates assignment of multiple price level groups to a single grouping of retail products or services according to an exemplary embodiment.

FIG. 5 illustrates the assignment of multiple price level groups 104 to a single grouping of retail products or services 520 according to an exemplary embodiment. In the illustrated embodiment, price level groups 104a and 104b are assigned to grouping of retail products or services 620, which may be, for example, a node in article hierarchy 300 (shown in FIG. 3), a node in merchandise hierarchy 400 (shown in FIG. 4), or another grouping of retail products or services.

Where multiple price level groups 104 are assigned to a grouping of retail products or services 520, each assigned price level group 104 has a temporally separate validity period based on each price schema 106 associated with the price level group 104. For example, in the illustrated embodiment, price schema 106a and price schema 106b are associated with price level group 104a, while price schema 106c is associated with price level group 104b. Accordingly, price schema 104a may have a validity period VP1 of, for example, Jan. 1, 2004 to Jan. 31, 2004, price schema 104b may have a validity period VP2 of Feb. 1, 2004 to Feb. 29, 2004, and price schema 106c may have a validity period VP3 of Mar. 1, 2004 to Mar. 31, 2004, such that price level groups 104a and 104b have temporally separate validity periods of Jan. 1, 2004 to Feb. 29, 2004 (i.e., VP1+VP2) and Mar. 1, 2004 to Mar. 31, 2004 (i.e., VP3) respectively.

According to an exemplary embodiment, each price level group category 102 may be configured to control whether multiple price level groups 104 associated with it may be assigned to a single grouping of retail products or services, such as grouping 520. For example, in the illustrated embodiment, price level group category 102a may have an associated function module including a field which may be used to determine a "validity active" setting. In this embodiment, if the field is set to a particular predetermined value (e.g., "blank," "inactive," etc.) such that multiple validity periods are not active, only one price schema can be assigned to each price level group. The price schema assigned to each price level group will have a validity period with a predetermined end date set to, for example, Dec. 31, 9999, such that each price level group will also have a validity period with a predetermined end date set to, for example, Dec. 31, 9999.

For example, if multiple validity periods are not active, only price schema 106a may be assigned to price level group 104a, and price schema 106a will have a predetermined end date automatically set to, for example, Dec. 31, 9999, as will price schema 106c. According to an exemplary embodiment, this predetermined end date may be modified. Price level group 104a and price level group 104b will have overlapping validity periods with predetermined end dates set to, for example, Dec. 31, 9999 based on their associated price schemas (i.e., price schemas 106a and 106c). Accordingly, only one price level group (e.g., 104a or 104b) may be assigned to grouping of retail products or services 520 because of the overlapping validity periods.

If the field used to determine the "validity active" setting is set to another predetermined value, multiple validity periods are active, and price schemas having differing validity periods are allowed, such that multiple price schemas may be assigned to each price level group, and thus both of price level groups 104a and 104b may be assigned to grouping of retail products or services 520. According to another embodiment, if the "validity active" field is changed from a value which does not allow multiple price level groups 104 to be assigned to a value which allows multiple price level groups 104 to be assigned, a message may be generated indicating that validity periods must now be maintained for each price schema 106 assigned to a price level group 104.

Figure 6:
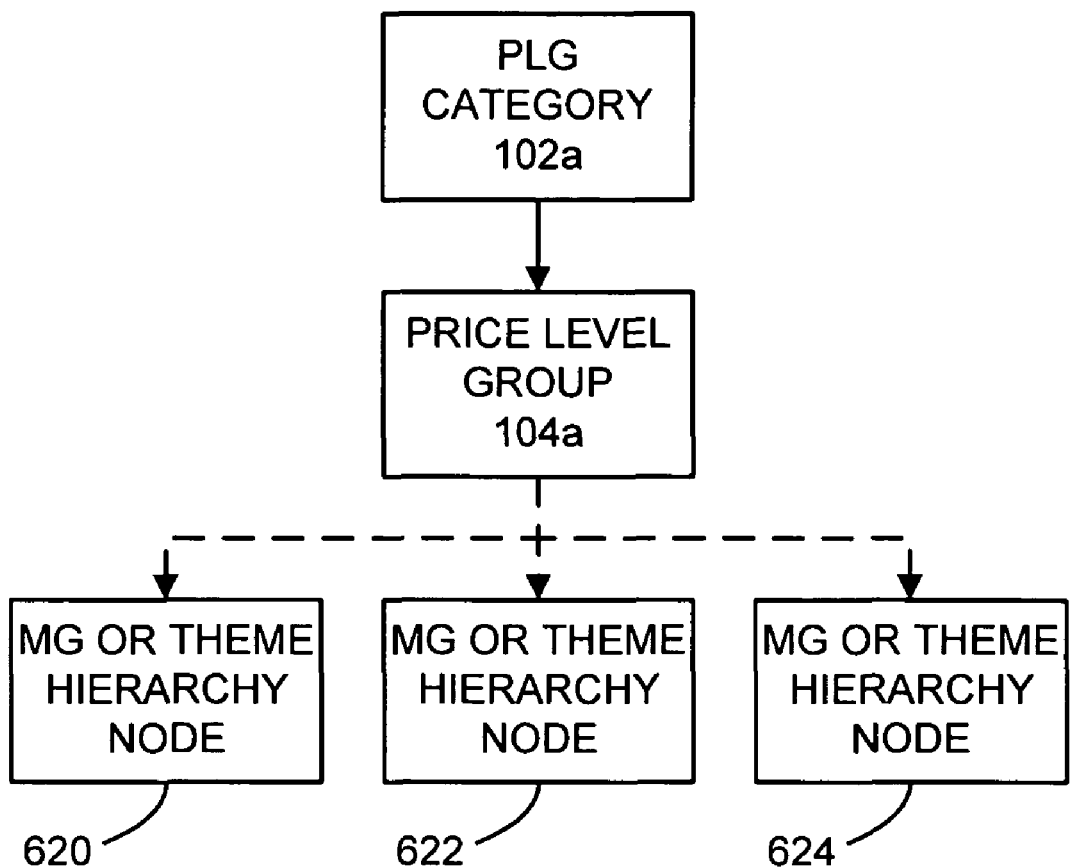
FIG. 6 is a block diagram which illustrates the assignment of a single price level group to multiple groupings of retail products or services according to an exemplary embodiment.

FIG. 6 illustrates the assignment of a price level group 104 to multiple groupings of retail products or services according to an exemplary embodiment. In the illustrated embodiment, price level group 104a is assigned to groupings of retail products or services 620, 622, and 624. As with grouping of retail products or services 520, groupings of retail products or services 620, 622, and 624 may be, for example, a node in article hierarchy 300 (shown in FIG. 3), a node in merchandise hierarchy 400 (shown in FIG. 4), or another grouping of retail products or services.

According to an exemplary embodiment, each price level group category 102 may be configured to control whether a price level group 104 associated with it may be assigned to multiple groupings of retail products or services, such as the assignment of price level group 104a to groupings 620, 622, and 624. For example, in the illustrated embodiment, price level group category 102a may have an associated function module which may be used to determine a "multiple assignment of price level group" field. If the field is set to one predetermined value, price level group 104a may be assigned to only one of groupings of retail products or services 620, 622, and 624. If the field is set to another predetermined value, price level group 104a may be assigned to one or more of groupings of retail products or services 620, 622, and 624. According to another embodiment, if the "multiple assignment of price level group" field is changed from a value which allows a price level group 104 to be assigned to multiple groupings of retail products or services, such as groupings 620, 622, and 624, to a value which does not allow a price level group 104 to be assigned to multiple groupings of retail products or services, an error message may be generated.

According to an exemplary embodiment, each price level group category 102 may be configured to control whether assignment of a price level group 104 within the category to a grouping of retail products or services is required. For example, each price level group category 102 may have an associated function module which may be used to determine a "required assignment of price level group" field. If the field is set to one predetermined value, a price level group 104 is not required to be assigned to each grouping of retail products or services. If the field is set to another predetermined value, price level group 104a may optionally be assigned to each grouping of retail products or services, but is not required. According to another embodiment, changing the "required assignment of price level group" field from a value which allows optional assignment of a price level group 104 to a value which requires assignment of a price level group 104 is not allowed.

Figure 7:
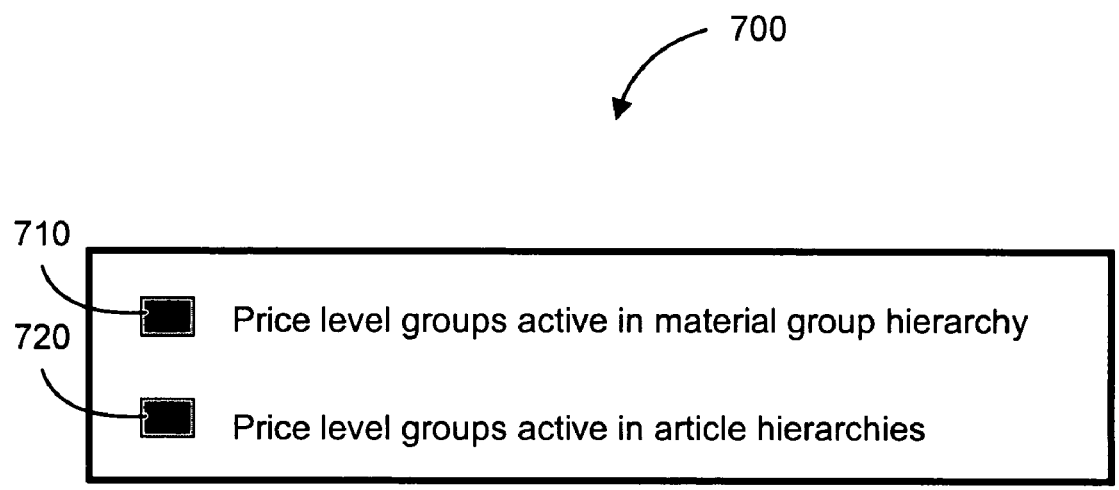
FIG. 7 illustrates a graphical user interface which may be used to configure whether price level groups are separately activated for a merchandise hierarchy and an article hierarchy according to an exemplary embodiment.

FIG. 7 illustrates a graphical user interface 700 which may be used to configure whether price level groups 104 are separately activated for a merchandise hierarchy and an article hierarchy according to an exemplary embodiment. In the illustrated embodiment, graphical user interface 700 may be used to set a value for a "price level groups active in material group hierarchy" field 710, and a value for a "price level groups active in article hierarchies" field 720. If field 710 is set to one predetermined value, it is possible to assign price level groups 104 to nodes within a merchandise hierarchy. If field 710 is set to another predetermined value, then price level groups 104 are not active for nodes within a merchandise hierarchy. Similarly, if field 720 is set to one predetermined value, it is possible to assign price level groups 104 to nodes in an article hierarchy (i.e., nodes in an article hierarchy). If field 720 is set to another predetermined value, then price level groups 104 are not active for nodes in an article hierarchy.

Figure 8:
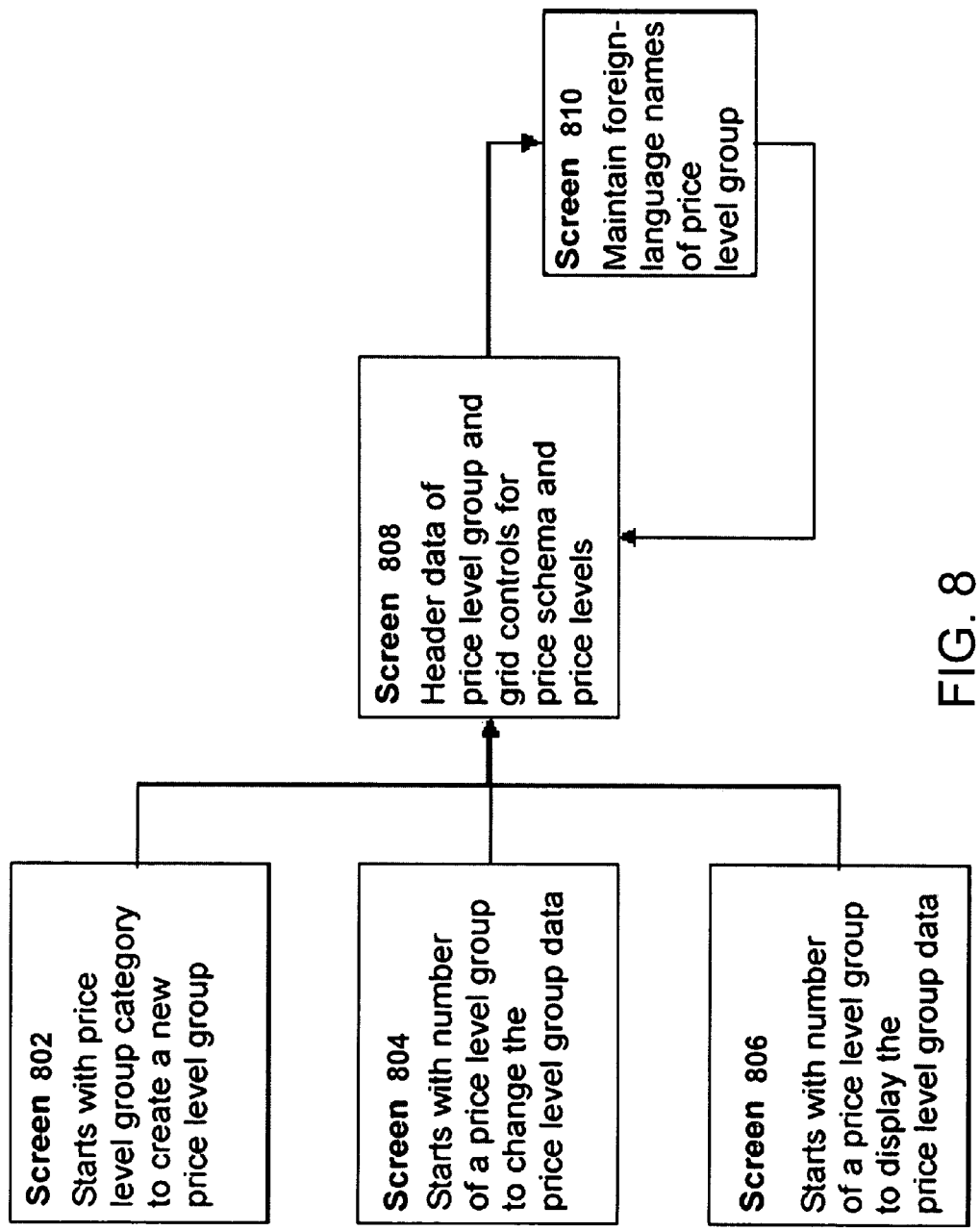
FIG. 8 is a block diagram which illustrates a sequence of graphical user interface screens which may be used to facilitate the creation, change, and display of price level groups according to an exemplary embodiment.

FIG. 8 illustrates a sequence of graphical user interface screens which may be used to facilitate the creation, change, and display of price level groups 104 according to an exemplary embodiment. Screen 802 is an initial screen which is configured to facilitate the creation of a price level group 104. Screen 904 is an initial screen which is configured to facilitate the changing of data for a price level group 104. Screen 806 is an initial screen which is configured to facilitate the display of data for a price level group 104. Screen 808 is a shared screen which is configured to facilitate the creation, change, and display of price level groups 104 depending upon which of initial screens 802, 804, and 806 screen 808 is called from. For example, if screen 808 is called from initial screen 802, elements of screen 808 which are related to the creation of a price level group 104 are active. Screen 810 is a screen which may be used to maintain foreign language names for price level groups 104.

Figure 9A:
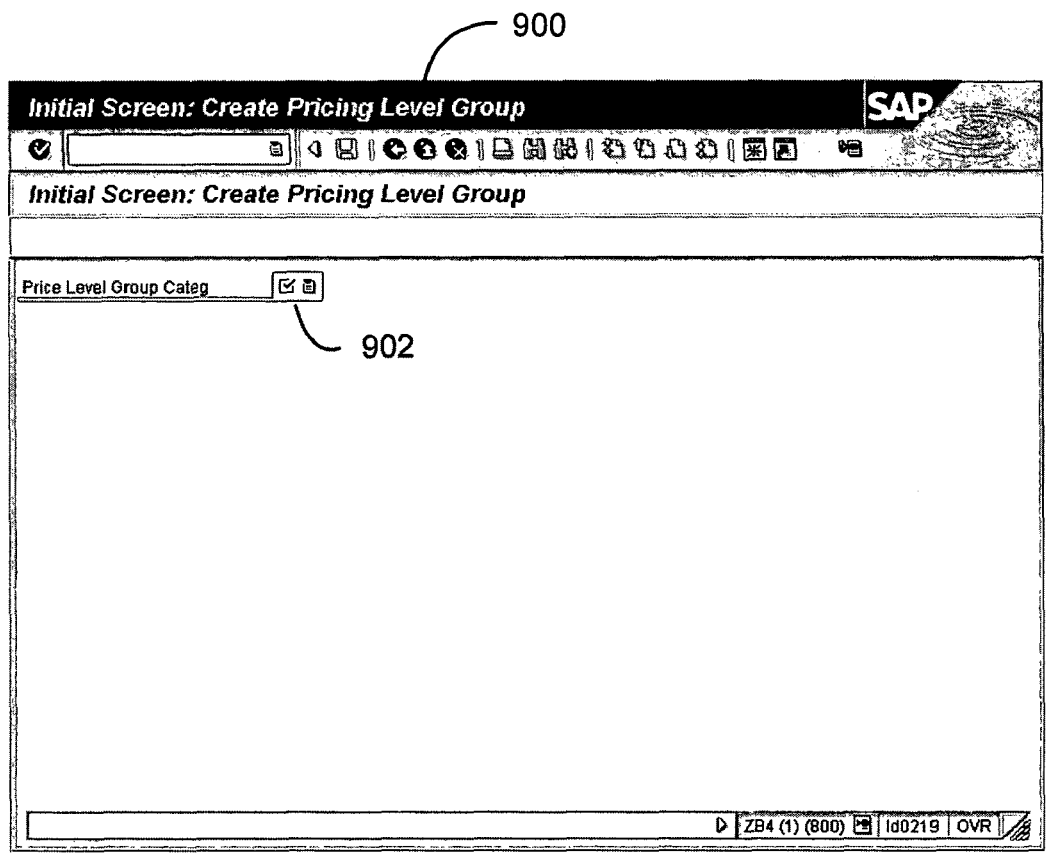
FIG. 9A illustrates an initial screen configured to facilitate the creation of a price level group according to an exemplary embodiment.
Figure 9B:
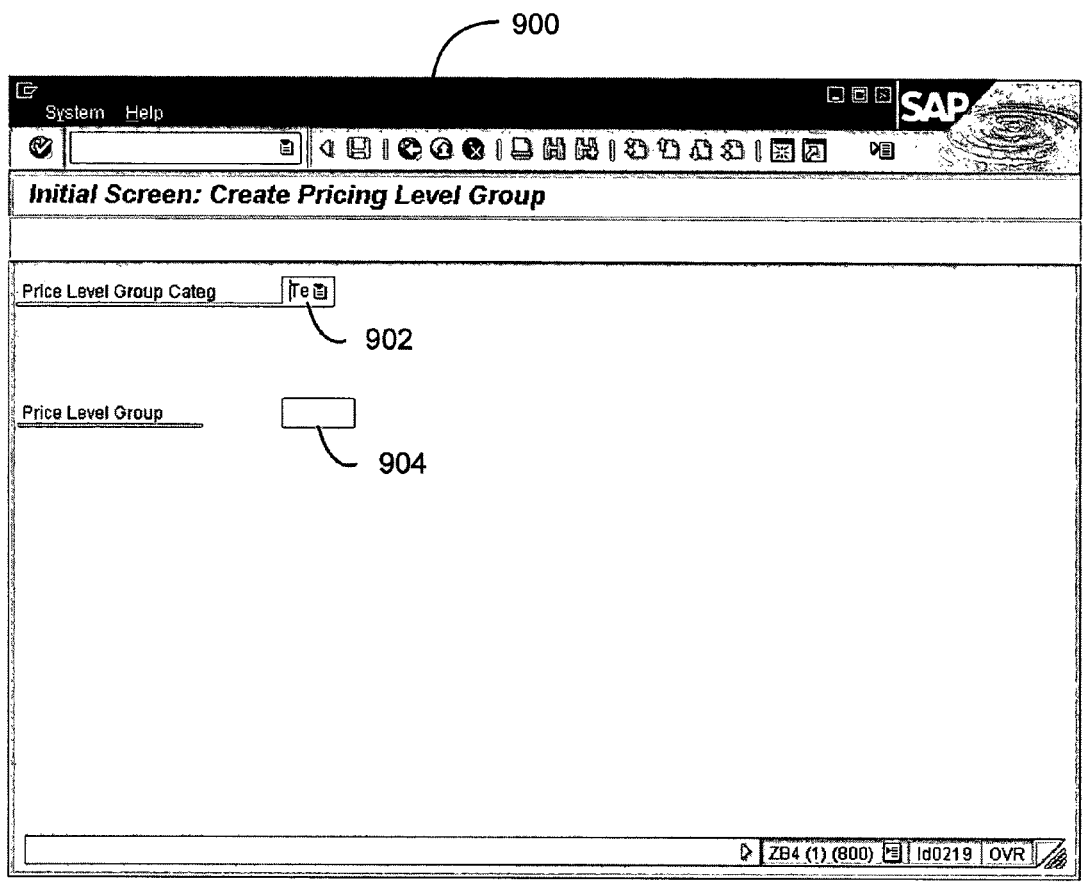
FIG. 9B illustrates the initial screen of FIG. 9A with an additional field or area for entering an ID or key for a price level group.

FIG. 9A illustrates an exemplary implementation 900 of screen 802. Screen 900 is called to create a new price level group 104. In the illustrated embodiment, screen 900 provides a field or area 902 in which a price level group category 102 may be entered. The price level group category 102 that is entered determines the manner in which screen 808 (shown in FIG. 8.) is called and displayed. For example, according to an exemplary embodiment, screen 900 may also provide a field or area 904 as shown in FIG. 9B in which an ID or key (e.g., text, number, etc.) may be assigned to price level group 104, depending upon whether assignment of the ID or key is internal, external, or both, as determined by the price group category entered in field 902. If assignment of the ID or key is external, field 904 is displayed as shown in FIG. 9B, and a key must be entered. If a valid ID or key is entered, screen 808 is then called and displayed. If no key is entered, an error message is generated. If assignment of the ID or key is internal, field 904 shown in FIG. 9B is not displayed, the next available internal ID or key is automatically assigned, and screen 808 is then called and displayed. If the ID or key may be assigned both internally and externally, and a strictly numeric number is entered, an error message is generated; and if no key is entered, the next available internal number is automatically assigned.

Figure 10:
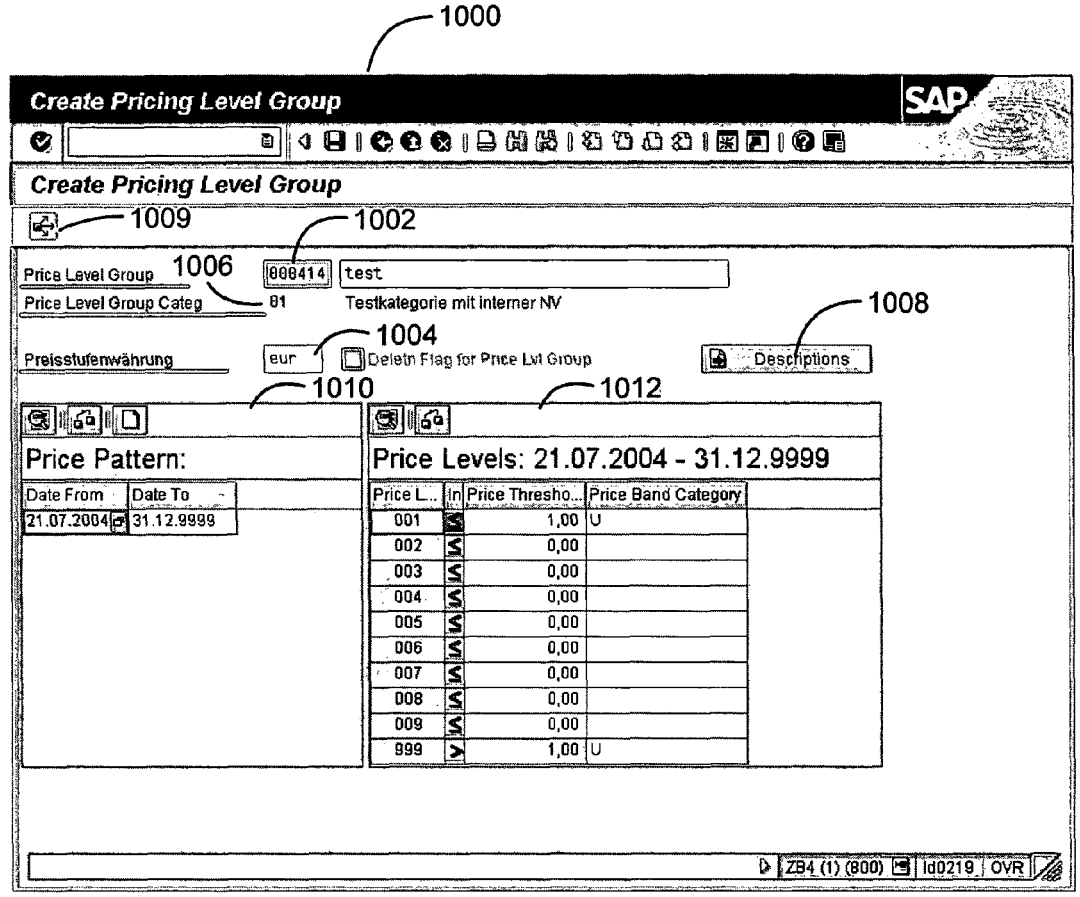
FIG. 10 illustrates a screen configured to facilitate the creation of a price level group according to an exemplary embodiment, wherein the active elements for creating a price level group are identified.

FIG. 10 illustrates an exemplary implementation 1000 of screen 808, wherein the active elements for creating a price level group 104 are identified. In the illustrated embodiment, screen 1000 provides a header field 1002 in which the ID or key assigned or entered in screen 900 for price level group 104 is displayed, and a header field 1004 in which the desired currency is entered. Screen 1000 also provides a header field 1006 in which the price group category entered in field 902 is displayed.

Screen 1000 also provides a button or icon 1008 which may be used to create and maintain additional foreign language names for price level group 104 (e.g., by calling screen 810 when button or icon 1008 is selected or depressed). Screen 1000 further includes a button or icon 1009 which may be used to access functions for "change documents" (i.e., documents created to record creation of or changes to a price level group), merchandise hierarchy assignments, and article hierarchy assignments.

Figure 11:
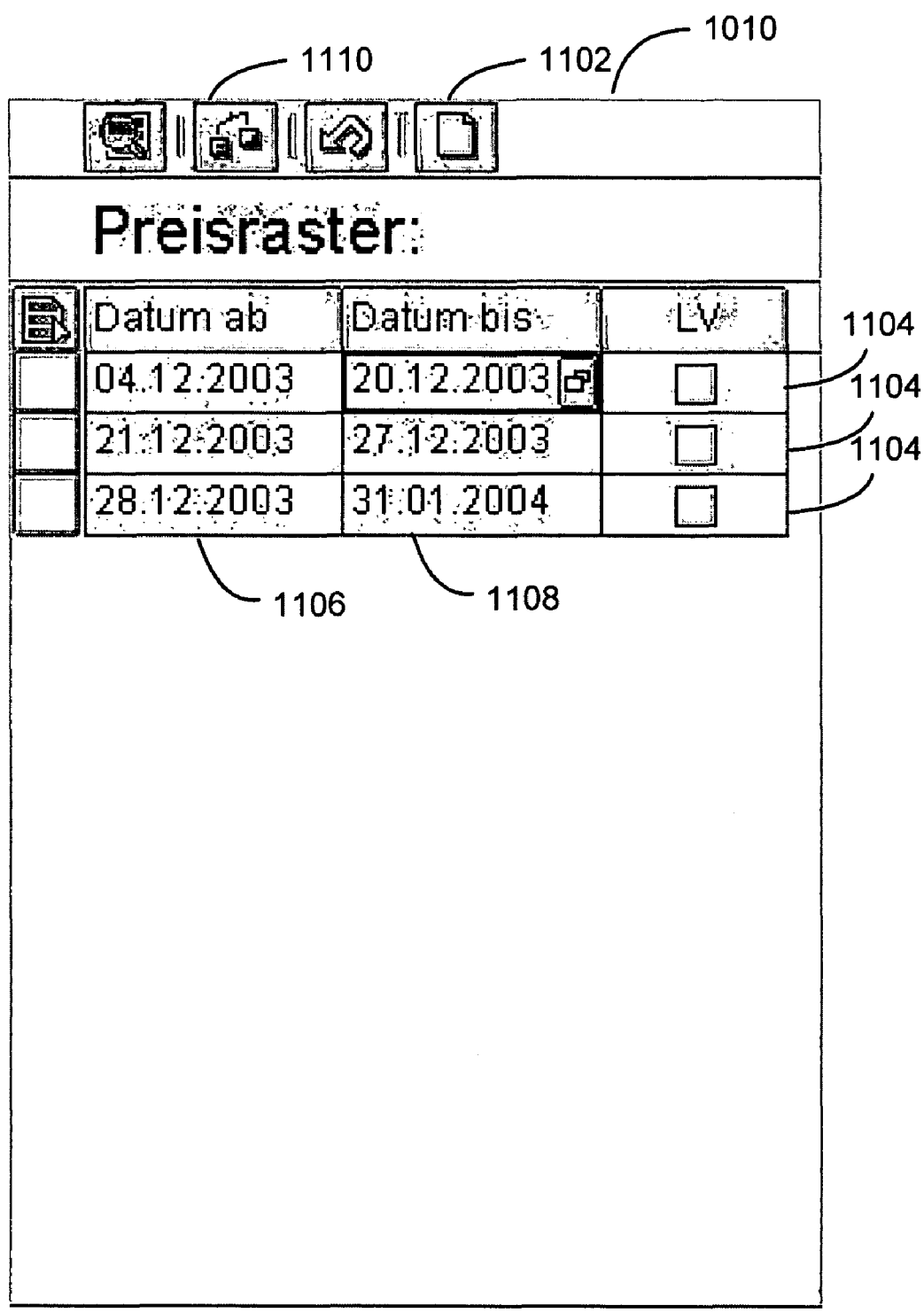
FIG. 11 illustrates in greater detail an area of the screen of FIG. 11 which may be used to create a price schema for a price level group according to an exemplary embodiment.

Once data for fields 1002, 1004, and 1006 have been entered, a schema control area 1010 for creating a price schema 106 and entering validity periods for the price schema 106 is activated. FIG. 11 illustrates schema control area 1010 of screen 1000 in greater detail according to an exemplary embodiment. A new price schema 106 may be created using a create button or icon 1102. When button or icon 1102 is selected or depressed (e.g., using a mouse pointer or other user input device), a new line 1104 appears in which validity dates may be entered for a price schema 106.

In the illustrated embodiment, each new line 1104 appears at the end of an existing price schema and includes a "from date" field 1106 and a "to date" field 1108 in which the desired dates for a validity period may be entered. According to an exemplary embodiment, the manner of entry of each date in the "from date" field 1106 and the "to date" field 1108 depends on whether differing validity periods are allowed (i.e., multiple price schemas 106), as determined by the associated price group category 102. If differing validity periods are not allowed, only the "from date" of the new price schema 1106 may be entered, and is preset to the current date, while the "to date" 1108 is set to a predetermined date in the future reserved as the last possible "from date" for a price schema, such as Dec. 31, 9999.

If differing validity periods are allowed, the manner of entry of the "from date" 1106 for each subsequent new price schema 106 depends on the "to date" 1108 representing the end date of the previous price schema. If the "to date" 1108 of the previous price schema is set to a predetermined date in the future reserved as the last possible "from date" for a price schema, such as Dec. 31, 9999, the new price schema will require a new "from date" 1106 and a new "to date" 1108 to be entered. If the "to date" 1108 of the previous price schema is not set to the predetermined date in the future reserved as the last possible "from date" for a price schema, such as Dec. 31, 9999, the "from date" of the subsequent new price schema is preset to the last "to date" 1108 of the previous price schema plus one day, and the "to date" 1108 of the new price schema is preset to Dec. 31, 9999. Each of these dates may then be modified.

Schema control area 1010 of screen 1000 also includes a button or icon 1110 which may be used to implement a check function to verify that the validity periods entered in fields 1106 and 1108 of each line 1104 are not overlapping, and that no gaps exist. According to an exemplary embodiment, an error or warning may be generated if any gaps or overlaps exist, and the incorrect data entries may be highlighted or otherwise indicated for correction.

Referring again to FIG. 10, once a validity period for each price schema 106 has been defined, price levels 108 may be defined in a price level control area 1012 for each price schema 106 created in schema control area 1010 of screen 1000. FIG. 12 illustrates price level control area 1012 of screen 1000 in greater detail according to an exemplary embodiment. A price level 108 may be created by selecting a price schema 106 in schema control area 1010 (e.g., by using a mouse or other user input device). When a price schema 106 is selected, a predetermined number of price level entry lines 1202 are created in price level control area 1012, and any existing price levels 108 will be displayed. According to an exemplary embodiment, ten price level entry lines 1202 are created in price level control area 1012 by default. According to another exemplary embodiment, the user may establish a desired maximum number of price level entry lines to be created, a minimum number of price levels that need to be filled, etc.

Each price level entry line 1202 includes a price limit or threshold field 1204 and a price band category field 1206, such that a price limit or threshold and price band category 110 may be defined for each price level 108. According to an exemplary embodiment, a value for price band category field 1206 may be assigned based on a predefined set of price band categories 110 (e.g., predefined price band categories representing a consumer price perception model having the levels "Lower," "Medium," and "Upper"). According to another exemplary embodiment, default data for price band category field 1206 may be created by the user such that, for example, a predetermined number of price band category fields 1206 are automatically set to one price band category (e.g., "Lower"), another predetermined number of price band category fields 1206 are automatically set to another price band category (e.g., "Medium"), etc.

Once the desired number of price levels 108 have been created for each price schema 106, the created price level group 104 may be saved. According to an exemplary embodiment, price level group 104 is not complete, and accordingly may not be saved, until it has been assigned at least one price schema 106 and corresponding price levels 108.

Figure 13:
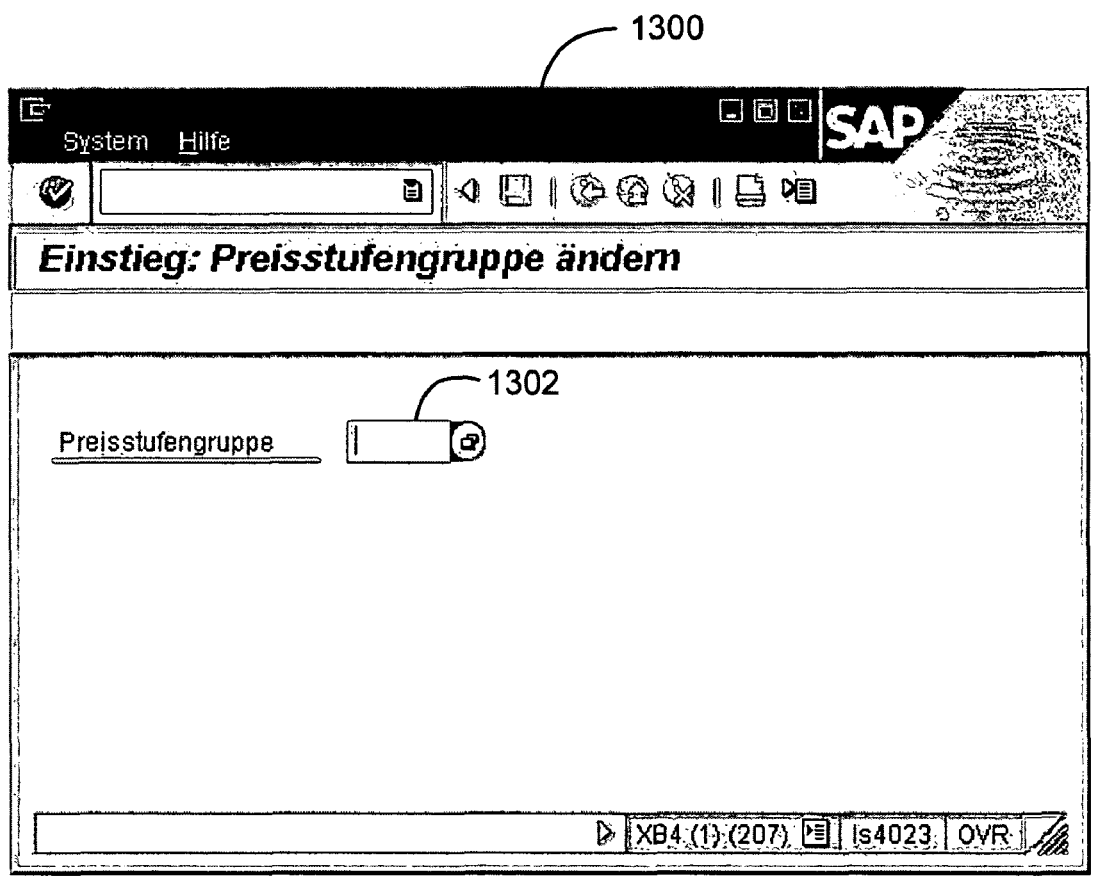
FIG. 13 illustrates an initial screen configured to facilitate the changing or deletion of a price level group according to an exemplary embodiment.

FIG. 13 illustrates an exemplary implementation 1300 of screen 804. Screen 1300 is called to change a price level group 104. In the illustrated embodiment, screen 1300 provides a field or area 1302 in which the number of the price level group 104 to be changed may be entered. Once the number of the price level group 104 to be changed has been entered, screen 808 is called as shown in FIG. 8.

Figure 14:
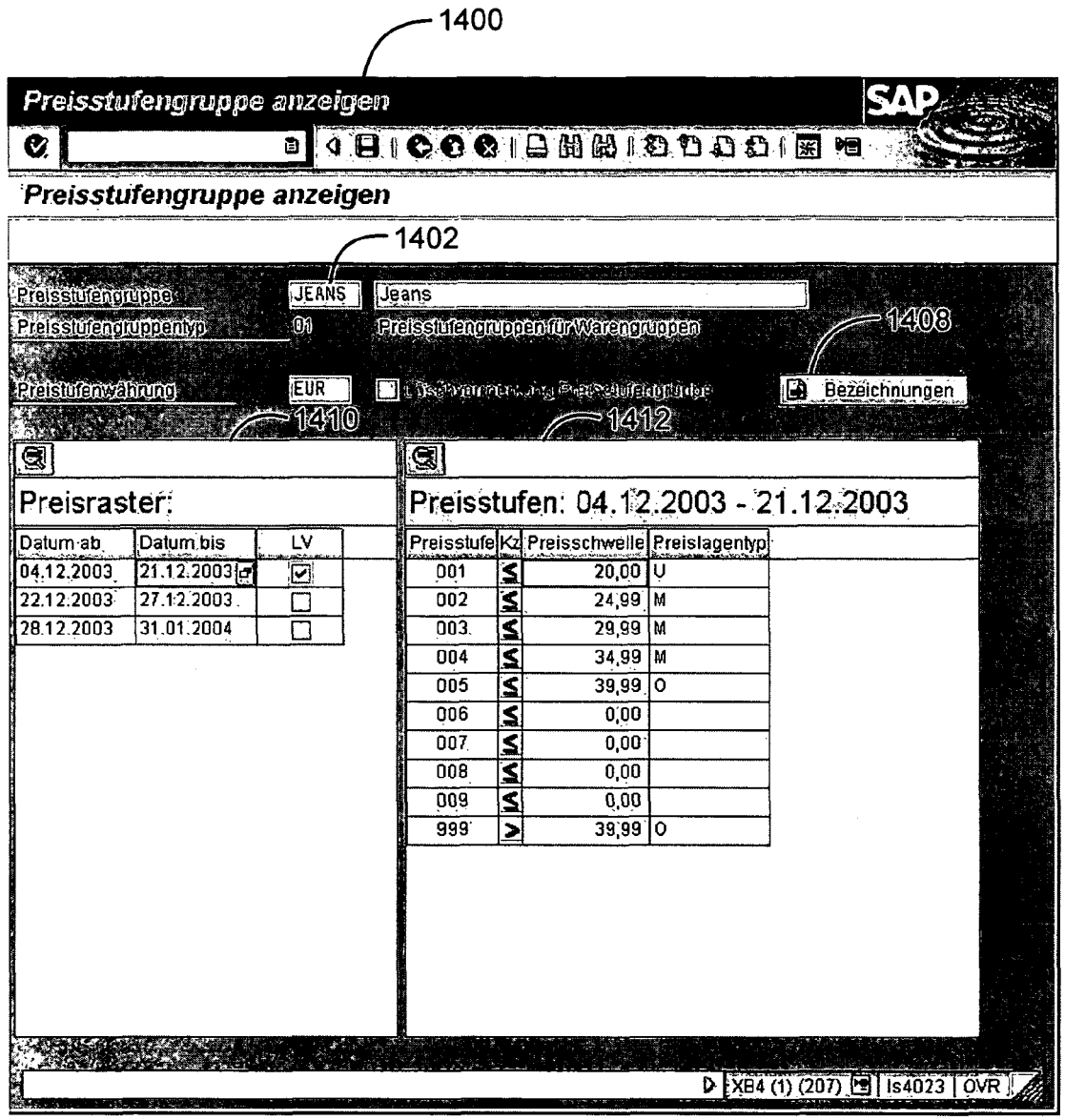
FIG. 14 illustrates a screen configured to facilitate the changing or deletion of a price level group according to an exemplary embodiment, wherein the active elements for changing or deleting a price level group are identified.

FIG. 14 illustrates an exemplary implementation 1400 of screen 808, wherein the active elements for changing a price level group 104 are identified. In the illustrated embodiment, screen 1400 provides field 1402, which may be used to change the name for price level group 104. Screen 1400 also provides a button or icon 1408 which may by used to create and maintain additional foreign language names for price level group 104 (e.g., by calling screen 810 when button or icon 1408 is selected or depressed). Screen 1400 further provides a schema control area 1410 and a price level control area 1412. Schema control area 1410 may be used to change the validity periods of each price schema 106 associated with price level group 104. Price level control area 1412 may be used to change the price levels 108 within a particular price schema 106.

According to an exemplary embodiment, a menu function in screen 1400 is also configured to facilitate the display of a list of nodes in a merchandise hierarchy or nodes in an article hierarchy to which the price group 104 has been assigned. According to another exemplary embodiment, a menu function may also be provided in screen 1400 to display "change documents" (i.e., documents created to record creation of or changes to a price level group 104).

According to an exemplary embodiment, when a validity period of a price schema 106 associated with price level group 104 is changed using screen 1400, a validity check is performed to ensure that no validity period overlaps result from the change, and if an overlap is detected as a result of the change, an error message is generated. A validity check is also performed to ensure that no validity period gaps result from the change, and if a gap is detected as a result of the change, a warning is generated. According to another exemplary embodiment, if changes to a price level 108 are required, the validity period of the corresponding price schema 106 is adjusted, and a new subsequent price schema is then created with the new price level 108.

According to an exemplary embodiment, to delete a price level group 104 completely, no corresponding price schemas 104 and price levels 108 may exist for the price level group 104, and the price level group 104 may not be assigned to a grouping of retail products or services. In this embodiment, a price level group 104 is not deleted directly from screen 1400, but rather is automatically deleted at a later time in a separate deletion process based in the flagging of the corresponding price schemas 106, as will be described below. Each price schema 106 associated with a price level group 104 may be flagged for deletion from screen 1400 and then deleted at a later time in the separate deletion process. In this embodiment, each price level 108 corresponding to a price schema 106 flagged for deletion is automatically flagged for deletion.

Figure 15:
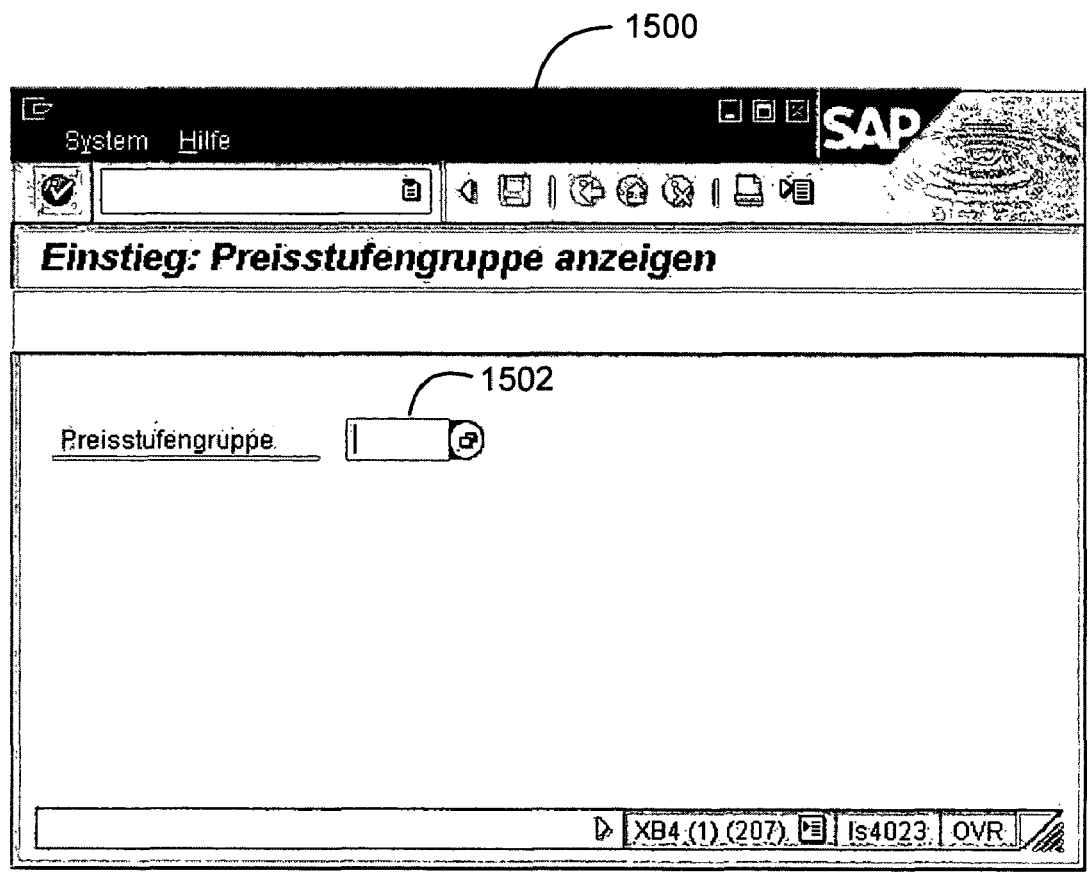
FIG. 15 illustrates an initial screen configured to facilitate the display of a price level group according to an exemplary embodiment.

FIG. 15 illustrates an exemplary implementation 1500 of screen 806. Screen 1500 is called to display a price level group 104. In the illustrated embodiment, screen 1500 provides a field or area 1502 in which the number of the price level group 104 to be displayed may be entered. Once the number of the price level group 104 to be displayed has been entered, screen 808 is called and displayed as shown in FIG. 8.

Figure 16:
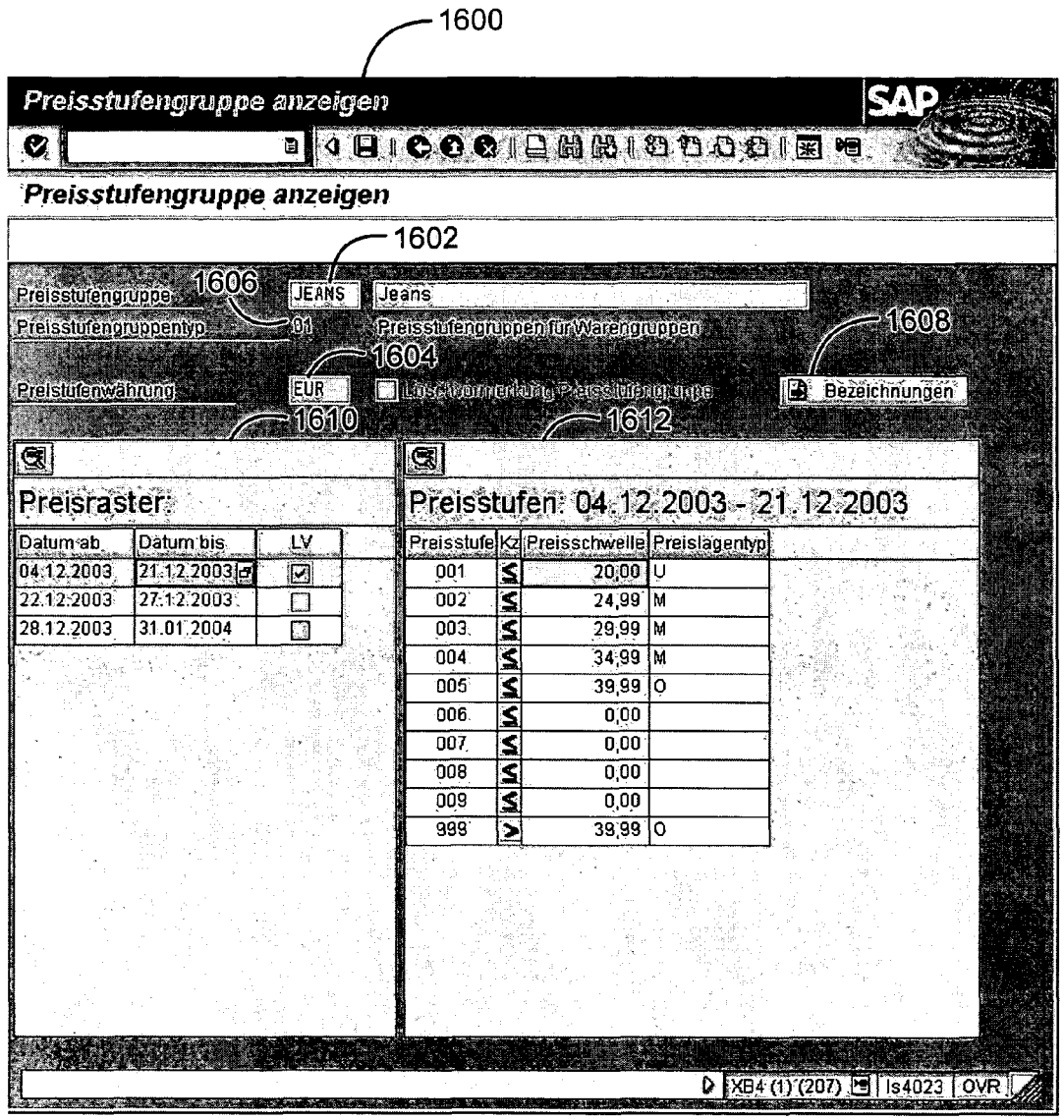
FIG. 16 illustrates a screen configured to facilitate the display of a price level group according to an exemplary embodiment, wherein the active elements for displaying a price level group are identified.

FIG. 16 illustrates an exemplary implementation 1600 of screen 808, wherein the active elements for displaying a price level group 104 are identified. Screen 1600 differs from screen 1000 in that the functions implemented in screen 1600 are for display only. In the illustrated embodiment, screen 1600 provides a header field 1602 in which a name for price level group 104 is displayed, and a header field 1604 in which the currency is displayed. According to one embodiment, screen 1600 may also provide a header field 1606 in which a key or number assigned to price level group 104 is displayed. Screen 1600 also provides a button or icon 1608 which may by used to display any additional foreign language names for price level group 104 (e.g., by calling screen 810 when button or icon 1608 is selected or depressed). Screen 1600 further includes menu functions for "change documents" (i.e., documents created to record creation of or changes to a price level group), merchandise hierarchy assignments, and article hierarchy assignments. Screen 1600 further provides a schema control area 1610 and a price level control area 1612. Schema control area 1610 may be used to display the validity periods of each price schema 106 associated with price level group 104. Price level control area 1612 may be used to display the price levels 108 within a particular price schema 106.

Figure 17:
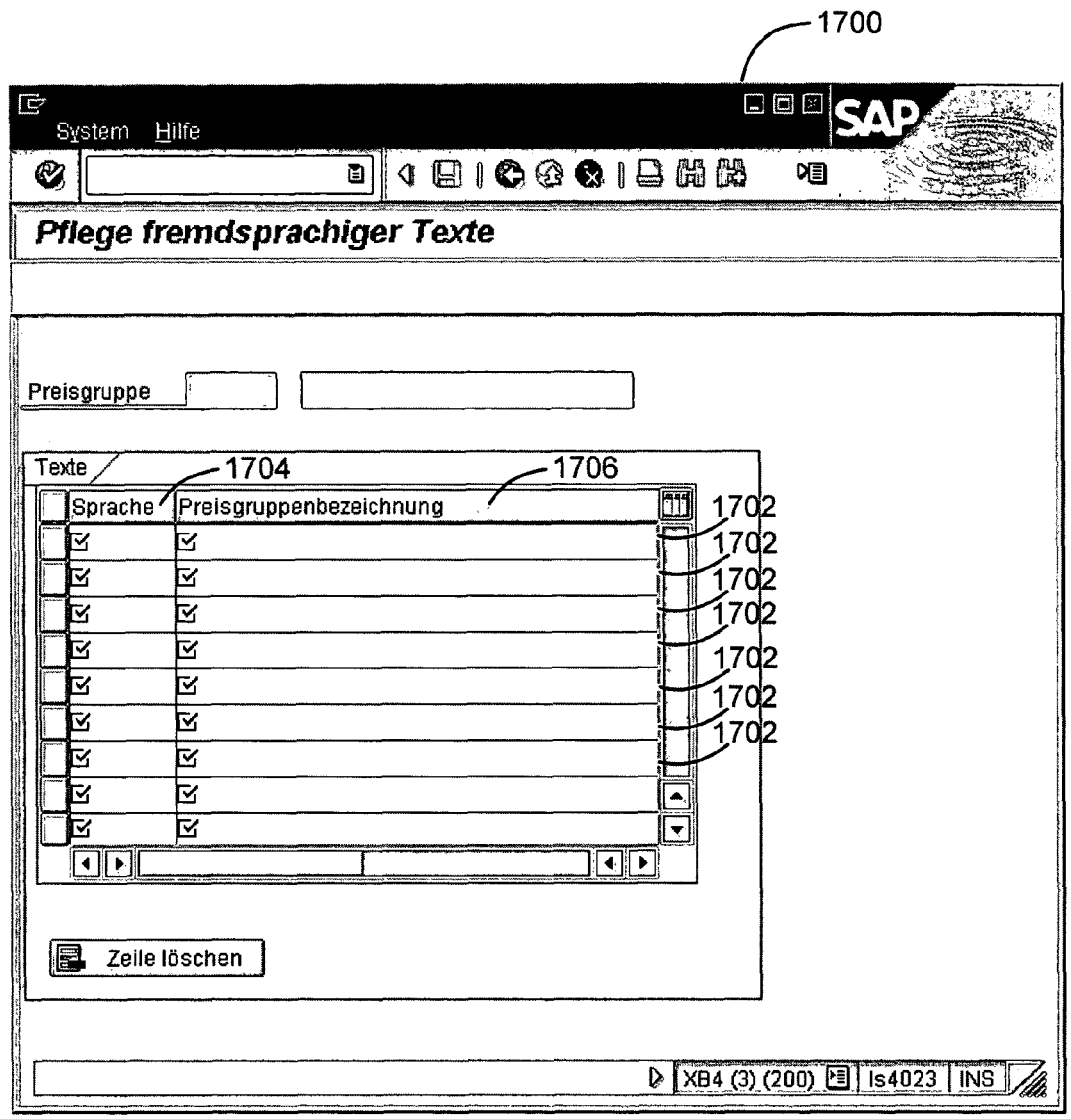
FIG. 17 illustrates a screen which may be used to create and maintain foreign language names for a price level group according to an exemplary embodiment.

FIG. 17 illustrates an exemplary implementation 1700 of screen 810, which may be used to create and maintain foreign language names for a price level group 104. Screen 1700 includes rows 1702 for entering foreign language names. Each row 1702 includes a column 1704 for the language and a column 1706 for the name of the price level group 104.

Figure 18:
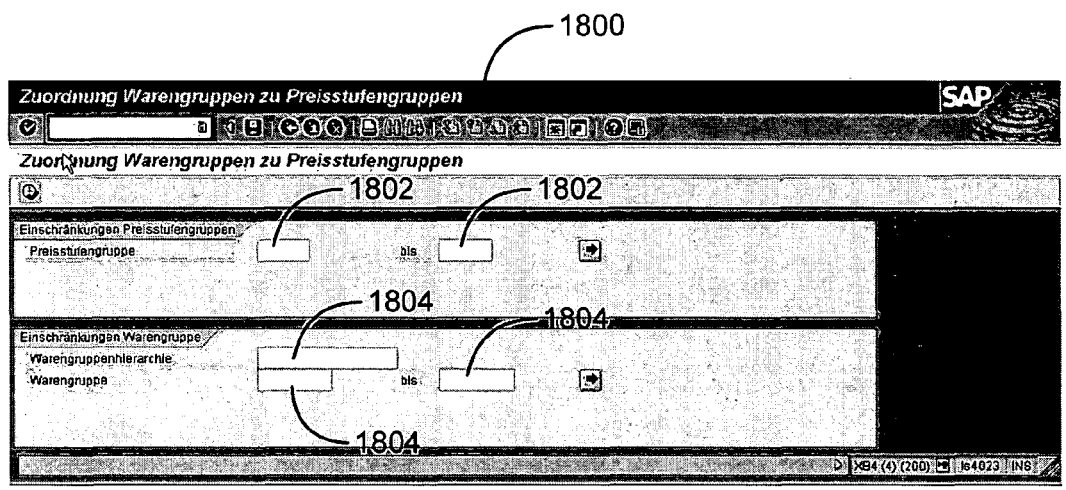
FIG. 18 illustrates an initial screen which may be used to select a number of price level groups and nodes in a merchandise hierarchy for multiple assignment according to an exemplary embodiment.

FIG. 18 illustrates an initial screen 1800 which may be used to select a number of price level groups 104 and one or more nodes or other groupings of retail products or services in a merchandise hierarchy (e.g., merchandise hierarchy 400 shown in FIG. 4) for multiple assignment according to an exemplary embodiment. Screen 1800 provides a number of restriction fields 1802 in which values may be entered to restrict which price level groups 104 are included, and a number of restriction fields 1804 in which values may be entered to restrict which nodes in the merchandise hierarchy are included. If no restrictions are entered, all relevant price level groups 104 and nodes in the merchandise hierarchy are included. If restrictions are entered, all price level groups 104 that comply with the restriction are included. Further, the assigned nodes in the merchandise hierarchy for the included price level groups 104 are included regardless of any merchandise hierarchy node restrictions, as well as any unassigned nodes in the merchandise hierarchy which meet the merchandise hierarchy node restrictions entered in restriction fields 1804.

Figure 19:
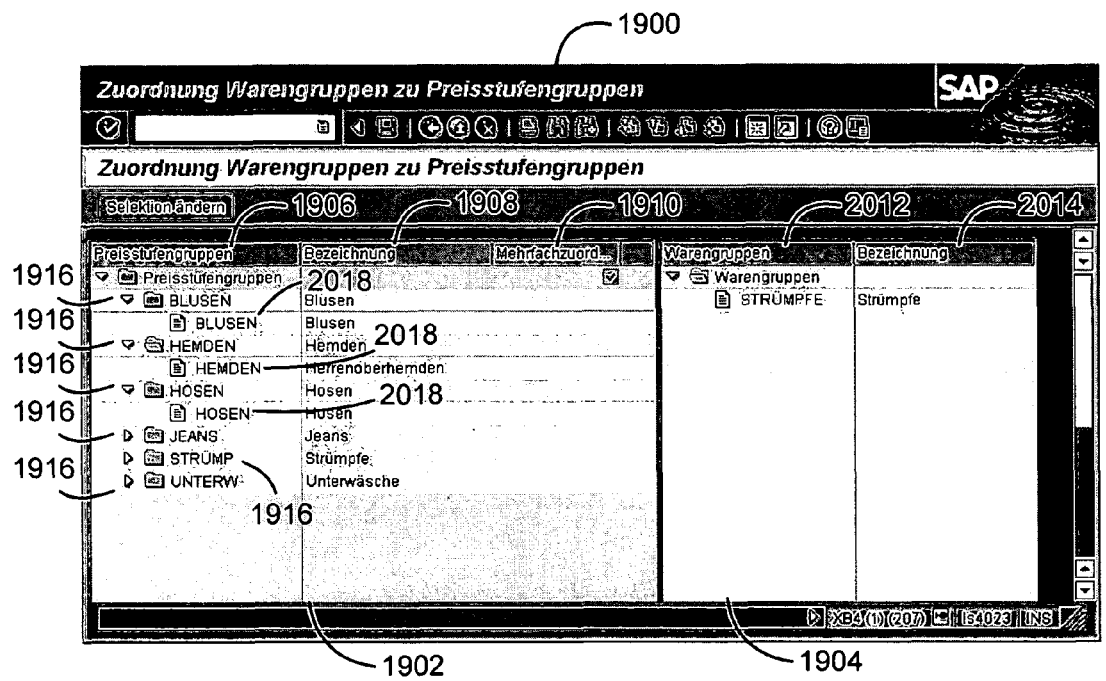
FIG. 19 illustrates a screen which is configured to facilitate the assignment of a price level group to one or more nodes in a merchandise hierarchy according to an exemplary embodiment.

FIG. 19 illustrates an exemplary screen 1900 which is configured to facilitate the assignment of a price level group 104 to one or more nodes in a merchandise hierarchy (e.g., merchandise hierarchy 500 shown in FIG. 5) where multiple assignment of merchandise hierarchy nodes to a price level group 104 is allowed. In the illustrated embodiment, multiple assignment of price level groups 104 may be implemented in screen 1900 using a "tree" structure wherein "drag and drop" commands are used to manipulate the selected price level groups and merchandise hierarchy nodes. In this embodiment, screen 1900 is partitioned into a left side area 1902 and a right side area 1904. Price level groups 104 which meet the restriction requirements entered in fields 1902 in screen 1900 are displayed in a price level group tree 1906 in left side area 1902. In addition, the name of each price level group 104 is displayed adjacent to price level group tree 1906 in a column 1908 in left side area 1902, and the multiple assignment attribute for the price level groups 104 is displayed in a column 1910 in left side area 1902. Each price level group 104 in price level group tree 1906 represents a node 1916 in price level group tree 1906 to which merchandise hierarchy nodes which are assigned to the price level group 104 associated with the node 1916 are attached. Selecting any node 1916 displays within price level group tree 1906 the name 2018 of each merchandise hierarchy node attached to the selected node 1916.

According to an exemplary embodiment, price level groups 104 in price level group tree 1906 cannot be moved and are always displayed. According to another exemplary embodiment, if multiple assignment is not allowed for a price level group 104, a check function may be performed to verify that only one merchandise hierarchy node is assigned to each price level group 104 in price level group tree 1906. According to another exemplary embodiment, if a merchandise hierarchy node is assigned to a price level group 104 that has been flagged for deletion but not yet deleted, a warning is generated.

Merchandise hierarchy nodes which have not been assigned to a price level group 104 and which meet the restriction requirements entered in fields 1804 in screen 1800 (shown in FIG. 18) are displayed in a merchandise hierarchy node tree 2012 in right side area 1904. In addition, the name of each merchandise hierarchy node is displayed adjacent to merchandise hierarchy node tree 2012 in a column 2014 in right side area 1904.

According to an exemplary embodiment, in order to assign an unassigned merchandise hierarchy node to a price level group 104, merchandise hierarchy nodes in merchandise hierarchy node tree 2012 may be selected individually or in groups and then "dragged" (e.g., with a mouse command, etc.) from merchandise hierarchy node tree 2012 to a node 1916 in price level group tree 1906. Once a merchandise hierarchy node is assigned to a price level group in this fashion, it is no longer displayed in merchandise hierarchy node tree 2012. Merchandise hierarchy nodes that are already assigned to a price level group 104 in price level group tree 1906 may be reassigned to another price level group 104 by selecting and dragging the merchandise hierarchy nodes to the desired node 1916. An assignment of a merchandise hierarchy node to a price level group 104 in price level group tree 1906 may be deleted by selecting and dragging the merchandise hierarchy node back to merchandise hierarchy node tree 2012.

Price level groups 104 may be locked according to an exemplary embodiment. For example, when a new price level group 104 is created, it may be locked to prevent the same price level group 104 from being created in parallel. When a price level group 104 is accessed, it may be locked to ensure that several users may not create or change the same price level group at the same time, and that the price level group 104 may not be deleted or flagged for deletion. If multiple assignment of groupings of retail products or services to a price level group 104 is not allowed, and a grouping of retail products or services is already assigned to the price level group 104, the price level group 104 may be locked to prevent the further assignment of groupings of retail products or services. Similarly, if multiple assignment of groupings of retail products or services to a price level group 104 is not allowed, each grouping of retail products or services not assigned to the price level group 104 may be locked to prevent the assignment of the price level group 104 to additional groupings of retail products or services. Further, a price level group 104 that is flagged for deletion may be locked during the deletion process.

As described above with reference to an exemplary embodiment, data for each price level group 104 is not deleted directly from, for example, screen 1400 shown in FIG. 14. In this embodiment, a deletion flag is set for price level group 104, and then price level group 104 is deleted after a specified delay (e.g., a number of days) in a separate deletion process. Deletion flags may be set automatically or manually. For example, a deletion flag may be set for a price schema 106 associated with price level group 104 after the validity period of price schema 106 expires, wherein the deletion indicator is automatically set for each price level 108 corresponding to price schema 106. If deletion flags are set for all price schemas 106 and all price levels 108 associated with price level group 104 (i.e. all validity periods have expired), price level group 104 is automatically flagged for deletion. Deletion flags may also be set manually using, for example, screen 1400 (shown in FIG. 14). According to an exemplary embodiment, to delete a price level group 104 completely, deletion flags must be set for all corresponding price schemas 106 and price levels 108 for the price level group 104, and the price level group 104 may not be assigned to a grouping of retail products or services.

According to an exemplary embodiment, a price level group reorganization function may be configured to perform deletion of price level groups 104. In this embodiment, the reorganization function first determines which price level groups 104 may be currently deleted. A price level group 104 may be currently deleted if a deletion flag for the price level group 104 was set prior to the specified delay, as measured from the time the reorganization function is initiated, and if the price level group is not currently assigned to any grouping of retail products or services. Price level groups 104 meeting these conditions are then deleted. The reorganization function then determines which price level groups 104 may not be currently deleted, but may be potentially be deleted in a subsequent execution of the reorganization function. For example, the reorganization function may automatically set flags for price level groups 104 having recently expired validity periods based on each associated price schema 106.

In this way, the method for and system of classifying retail products and services using price band categories provides for convenient and efficient reporting and analysis of sales data for retail products and services. By assigning a price level group to a grouping of retail products or services, individual price levels and associated price band categories may be used to report and analyze sales data for retail products or services.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some instances, the embodiments disclosed herein may be implemented by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. Machine-readable media for managing sales data of retail products and services using an automated process, the machine-readable media comprising program code stored therein executable by one or more machines to perform the automated process, the automated process comprising:

determining by a program module a first article hierarchy, the first article hierarchy comprising an enterprise level, a first customer field level, a first division level, a first customer theme level, a first theme module level, a first assortment module level, and a first article level;

determining by the program module a second article hierarchy, the second article hierarchy comprising the enterprise level, a second customer field level, a second customer theme level, a second theme module level, a second assortment module level, and a second article level;

determining by the program module a first price level group based on the first article hierarchy, wherein the first price level group includes a first price schema comprising a first price level and a second price level, the first price level being valid for a first time period and the second price level being valid for a second time period, wherein the first price level includes a first price limit and the second price level includes a second price limit, wherein the first price level and the second price level are assigned to a first band category, wherein the first band category is defined by a first price range, wherein the first price limit and the second price limit correspond to the first price range;

determining by the program module a second price level group based on the second article hierarchy, wherein the second price level group includes a second price schema comprising a third price level and a fourth price level, the third price level being valid for a third time period and the fourth price level being valid for a fourth time period, wherein the third price level includes a third price limit and the fourth price level includes a fourth price limit, wherein the third price level and the fourth price level are assigned to a second band category, wherein the second band category is defined by a second price range, wherein the third price limit and the fourth price limit correspond to the second price range;

analyzing and reporting by the program module distribution of sales data based on the first band category and the second band category;

generating by the program module an assortment plan based on the first price level, the first time period, the second price level, the second time period, the third price level, the third time period, the fourth price level, and the fourth time period; and storing at least one of the first hierarchy, the second hierarchy, the enterprise level, the first customer field level, the first division level, the first customer theme level, the first theme module level, the first assortment module level, the first article level, the second customer field level, the second division level, the second customer theme level, the second theme module level, the second assortment module level, the second article level, and the assortment plan.

2. The machine-readable media of claim 1, wherein the first theme module level is configured to be related to more than one assortment module levels.

3. The machine-readable media of claim 2, wherein the first assortment module level is configured to be related to more than one article levels.

4. The machine-readable media of claim 1, wherein at least one of the first price schema and the second price schema has a default number of price levels.

5. The machine-readable media of claim 4, wherein the default number is ten.

6. The machine-readable media of claim 1, wherein the first assortment module has a 1 to N ratio with at least one of the first customer theme level, the first division, and the first customer field level.

7. The machine-readable media of claim 1, wherein the first article level and the second article level are assigned to the first assortment level.

8. The machine-readable media of claim 1, wherein the first article level and the second article level are assigned to the first theme module level and the second article level is further assigned to the second theme module level.

9. The machine-readable media of claim 1, wherein the first article level and the second article level are assigned to the first assortment level, wherein the first article level and the second article level are assigned to the first theme module level and the second article level is further assigned to the second theme module level.

10. The machine-readable media of claim 1, wherein the first theme module level is configured to be related to more than one assortment module levels, wherein the first assortment module level is configured to be related to more than one article levels, and wherein at least one of the first price schema and the second price schema has a default number of price levels.

11. The machine-readable media of claim 10, wherein the first article level and the second article level are assigned to the first assortment level.

12. The machine-readable media of claim 11, wherein a price band category is associated with a price range indicative of a consumer's subjective price perception with regard to a sales price of one of a retail product and a service.

13. The machine-readable media of claim 12, further comprising reporting sales data based on the price band category.

14. The machine-readable media of claim 1, wherein the first article level and the second article level are assigned to the first theme module level and the second article level is further assigned to the second theme module level, wherein the first article level and the second article level are assigned to the first assortment level, wherein the first article level and the second article level are assigned to the first theme module level and the second article level is further assigned to the second theme module level, and wherein the first theme module level is configured to be related to more than one assortment module levels, wherein the first assortment module level is configured to be related to more than one article levels, and wherein at least one of the first price schema and the second price schema has a default number of price levels.

15. A system for managing sales data of retail products and services, the system comprising:

means for determining a first article hierarchy, the first article hierarchy comprising an enterprise level, a first customer field level, a first division level, a first customer theme level, a first theme module level, a first assortment module level, and a first article level;

means for determining a second article hierarchy, the second article hierarchy comprising the enterprise level, a second customer field level, a second customer theme level, a second theme module level, a second assortment module level, and a second article level;

means for determining a first price level group based on the first article hierarchy, wherein the first price level group includes a first price schema comprising a first price level and a second price level, the first price level being valid for a first time period and the second price level being valid for a second time period, wherein the first price level includes a first price limit and the second price level includes a second price limit, wherein the first price level and the second price level are assigned to a first band category, wherein the first band category is defined by a first price range, wherein the first price limit and the second price limit correspond to the first price range;

means for determining a second price level group based on the second article hierarchy, wherein the second price level group includes a second price schema comprising a third price level and a fourth price level, the third price level being valid for a third time period and the fourth price level being valid for a fourth time period, wherein the third price level includes a third price limit and the fourth price level includes a fourth price limit, wherein the third price level and the fourth price level are assigned to a second band category, wherein the second band category is defined by a second price range, wherein the third price limit and the fourth price limit correspond to the second price range;

means for analyzing and reporting distribution of sales data based on the first band category and the second band category;

means for generating an assortment plan based on the first price level, the first time period, the second price level, the second time period, the third price level, the third time period, the fourth price level, and the fourth time period; and means for storing at least one of the first hierarchy, the second hierarchy, the enterprise level, the first customer field level, the first division level, the first customer theme level, the first theme module level, the first assortment module level, the first article level, the second customer field level, the second division level, the second customer theme level, the second theme module level, the second assortment module level, the second article level, and the assortment plan.

16. The system of claim 15, wherein the first theme module level is configured to be related to more than one assortment module levels.

17. The system of claim 16, wherein the first assortment module level is configured to be related to more than one article levels.

18. The system of claim 15, wherein at least one of the first price schema and the second price schema has a default number of price levels.

19. The system of claim 18, wherein the default number is ten.

20. The system of claim 15, wherein the first assortment module has a 1 to N ratio with at least one of the first customer theme level, the first division, and the first customer field level.

21. The system of claim 15, wherein the first article level and the second article level are assigned to the first assortment level.

22. The system of claim 15, wherein the first article level and the second article level are assigned to the first theme module level and the second article level is further assigned to the second theme module level.

23. The system of claim 15, wherein the first article level and the second article level are assigned to the first assortment level, wherein the first article level and the second article level are assigned to the first theme module level and the second article level is further assigned to the second theme module level.

24. The system of claim 15, wherein the first theme module level is configured to be related to more than one assortment module levels, wherein the first assortment module level is configured to be related to more than one article levels, and wherein at least one of the first price schema and the second price schema has a default number of price levels.

25. The system of claim 24, wherein the first article level and the second article level are assigned to the first assortment level.

26. The system of claim 25, wherein a price band category is associated with a price range indicative of a consumer's subjective price perception with regard to a sales price of one of a retail product and a service.

27. The system of claim 26, further comprising means for reporting sales data based on the price band category.

28. The system of claim 15, wherein the first article level and the second article level are assigned to the first theme module level and the second article level is further assigned to the second theme module level, wherein the first article level and the second article level are assigned to the first assortment level, wherein the first article level and the second article level are assigned to the first theme module level and the second article level is further assigned to the second theme module level, and wherein the first theme module level is configured to be related to more than one assortment module levels, wherein the first assortment module level is configured to be related to more than one article levels, and wherein at least one of the first price schema and the second price schema has a default number of price levels.

29. A computer-readable media for managing sales data of retail products and services, the computer-readable media comprising machine-readable program code for causing, when executed, one or more machines to perform the following method steps:

determining by a program module a first article hierarchy, the first article hierarchy comprising an enterprise level, a first customer field level, a first division level, a first customer theme level, a first theme module level, a first assortment module level, and a first article level;

determining by the program module a second article hierarchy, the second article hierarchy comprising the enterprise level, a second customer field level, a second customer theme level, a second theme module level, a second assortment module level, and a second article level;

determining by the program module a third article hierarchy, the third article hierarchy comprising the enterprise level and a third customer field level, the third article hierarchy further comprising a third division level, a third customer theme level, a third theme module level, a third assortment module level, and a third article level;

determining by the program module a first price level group based on the first article hierarchy, wherein the first price level group includes a first price schema comprising a first price level and a second price level, the first price level being valid for a first time period and the second price level being valid for a second time period, wherein the first price level includes a first price limit and the second price level includes a second price limit, wherein the first price level and the second price level are assigned to a first band category, wherein the first band category is defined by a first price range, wherein the first price limit and the second price limit correspond to the first price range;

determining by the program module a second price level group based on the second article hierarchy, wherein the second price level group includes a second price schema comprising a third price level and a fourth price level, the third price level being valid for a third time period and the fourth price level being valid for a fourth time period, wherein the third price level includes a third price limit and the fourth price level includes a fourth price limit, wherein the third price level and the fourth price level are assigned to a second band category, wherein the second band category is defined by a second price range, wherein the third price limit and the fourth price limit correspond to the second price range;

determining by the program module a third price level group, wherein the third price level group includes a third price schema comprising a fifth price level and a sixth price level, the fifth price level being valid for a fifth time period and the sixth price level being valid for a sixth time period;

analyzing and reporting by the program module distribution of sales data based on the first band category and the second band category;

generating by the program module a first assortment plan based on the first price level, the first time period, the second price level, the second time period, the third price level, the third time period, the fourth price level, and the fourth time period;

generating by the program module a second assortment plan based on the third price level, the third time period, the fourth price level, the fourth time period, the fifth price level, the fifth time period, the sixth price level, and the sixth time period; and storing at least one of the first hierarchy, the second hierarchy, the enterprise level, the first customer field level, the first division level, the first customer theme level, the first theme module level, the first assortment module level, the first article level, the second customer field level, the second division level, the second customer theme level, the second theme module level, the second assortment module level, the second article level, the first assortment plan, and the second assortment plan.

30. The computer-readable media of claim 29, wherein the first theme module level is configured to be related to more than one assortment module levels.

31. The computer-readable media of claim 30, wherein the first assortment module level is configured to be related to more than one article levels.

32. The computer-readable media of claim 30, wherein at least one of the first price schema and the second price schema has a default number of price levels.

33. The computer-readable media of claim 32, wherein the default number is ten.

34. The computer-readable media of claim 29, wherein the first assortment module has a 1 to N ratio with at least one of the first customer theme level, the first division, and the first customer field level.

35. The computer-readable media of claim 29, wherein the first article level and the second article level are assigned to the first assortment level.

36. The computer-readable media of claim 29, wherein the first article level and the second article level are assigned to the first theme module level and the second article level is further assigned to the second theme module level.

37. The computer-readable media of claim 29, wherein the first article level and the second article level are assigned to the first assortment level, wherein the first article level and the second article level are assigned to the first theme module level and the second article level is further assigned to the second theme module level.

38. The computer-readable media of claim 29, wherein the first theme module level is configured to be related to more than one assortment module levels, wherein the first assortment module level is configured to be related to more than one article levels, and wherein at least one of the first price schema and the second price schema has a default number of price levels.

39. The computer-readable media of claim 38, wherein the first article level and the second article level are assigned to the first assortment level.

40. The computer-readable media of claim 39, wherein a price band category is associated with a price range indicative of a consumer's subjective price perception with regard to a sales price of one of a retail product and a service.

41. The computer-readable media of claim 40, further comprising reporting sales data based on the price band category.

42. The computer-readable media of claim 29, wherein the first article level and the second article level are assigned to the first theme module level and the second article level is further assigned to the second theme module level, wherein the first article level and the second article level are assigned to the first assortment level, wherein the first article level and the second article level are assigned to the first theme module level and the second article level is further assigned to the second theme module level, and wherein the first theme module level is configured to be related to more than one assortment module levels, wherein the first assortment module level is configured to be related to more than one article levels, and wherein at least one of the first price schema and the second price schema has a default number of price levels.

* * * * *